Aug. 22, 1939.　　　J. W. BRYCE　　　2,170,543
KEY PUNCH MULTIPLYING MACHINE
Filed Oct. 4, 1932　　　15 Sheets-Sheet 1

James W. Bryce
INVENTOR
BY
Cooper, Kerr & Dunham
ATTORNEYS

Aug. 22, 1939.   J. W. BRYCE   2,170,543
KEY PUNCH MULTIPLYING MACHINE
Filed Oct. 4, 1932   15 Sheets-Sheet 2
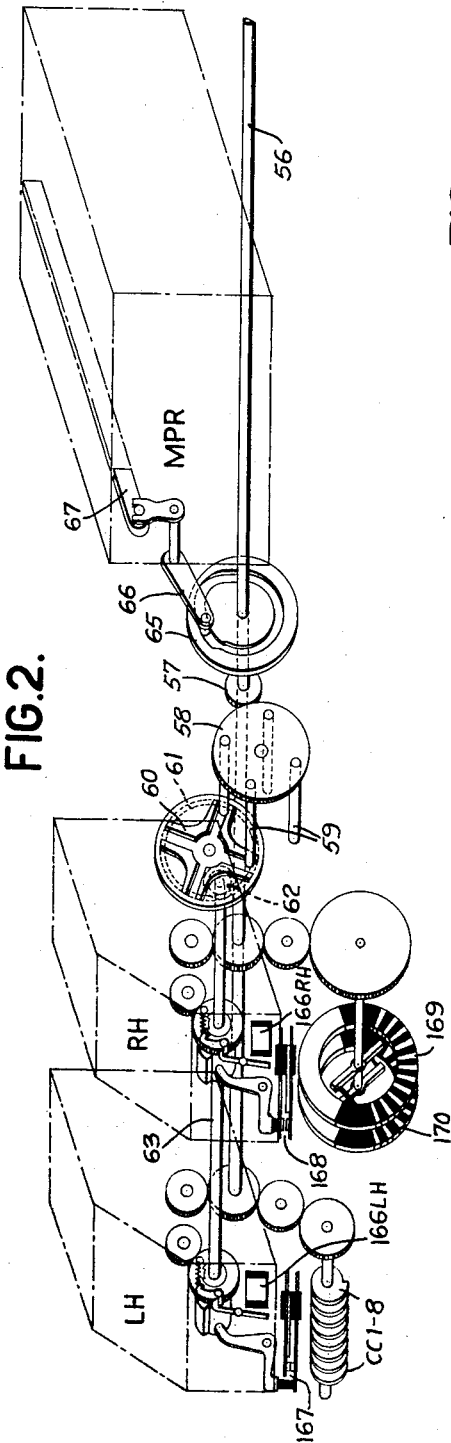
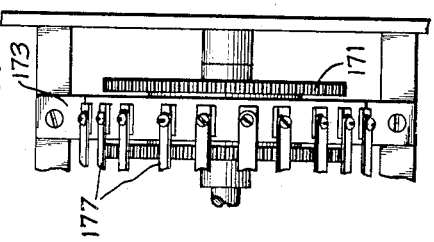
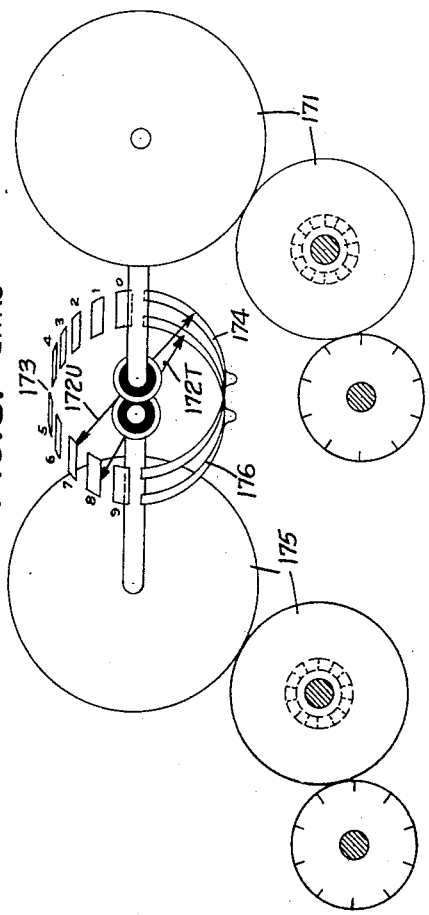
INVENTOR
James W. Bryce
BY
Cooper, Kerr & Dunham
ATTORNEYS Aug. 22, 1939.  J. W. BRYCE  2,170,543
KEY PUNCH MULTIPLYING MACHINE
Filed Oct. 4, 1932   15 Sheets-Sheet 3
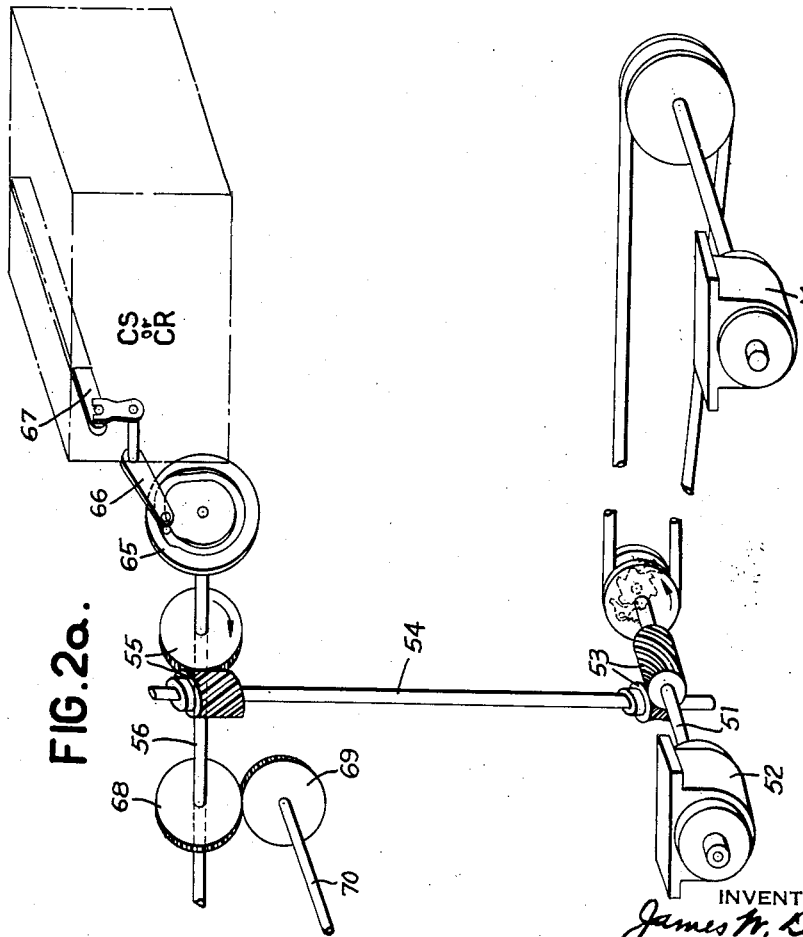

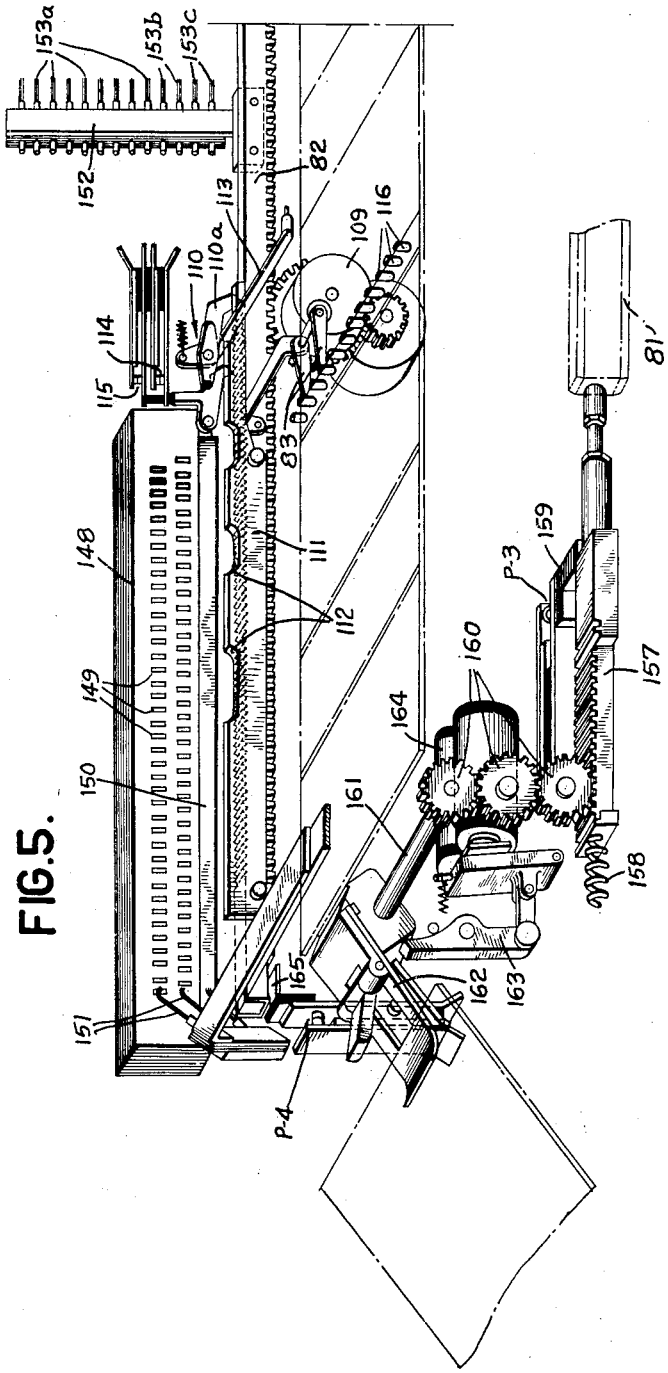

Aug. 22, 1939.          J. W. BRYCE          2,170,543
KEY PUNCH MULTIPLYING MACHINE
Filed Oct. 4, 1932          15 Sheets-Sheet 5
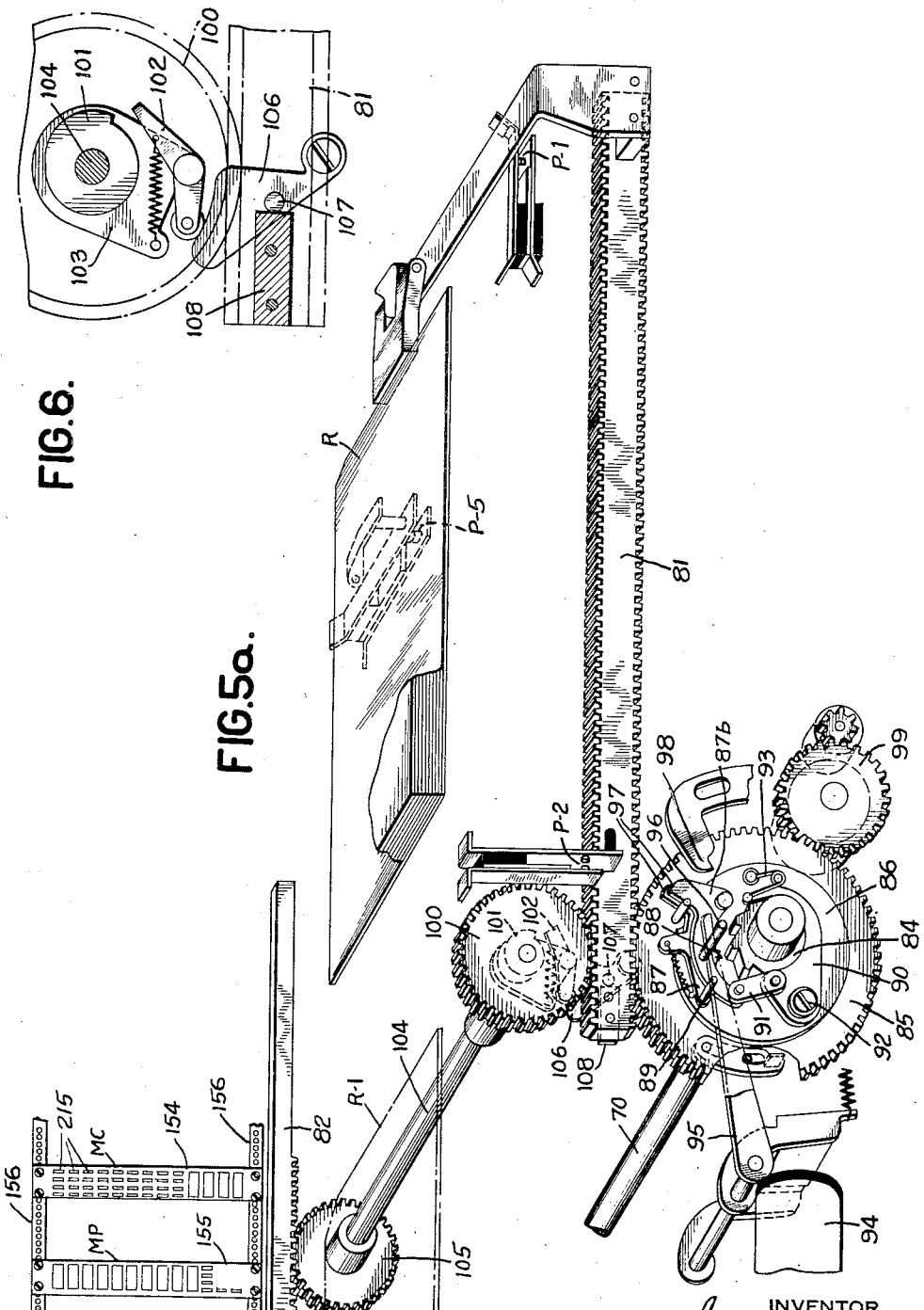
INVENTOR
James W. Bryce
BY
Cooper, Kerr & Dunham
ATTORNEYS Aug. 22, 1939.  J. W. BRYCE  2,170,543
KEY PUNCH MULTIPLYING MACHINE
Filed Oct. 4, 1932  15 Sheets-Sheet 6

Aug. 22, 1939.   J. W. BRYCE   2,170,543
KEY PUNCH MULTIPLYING MACHINE
Filed Oct. 4, 1932   15 Sheets-Sheet 7
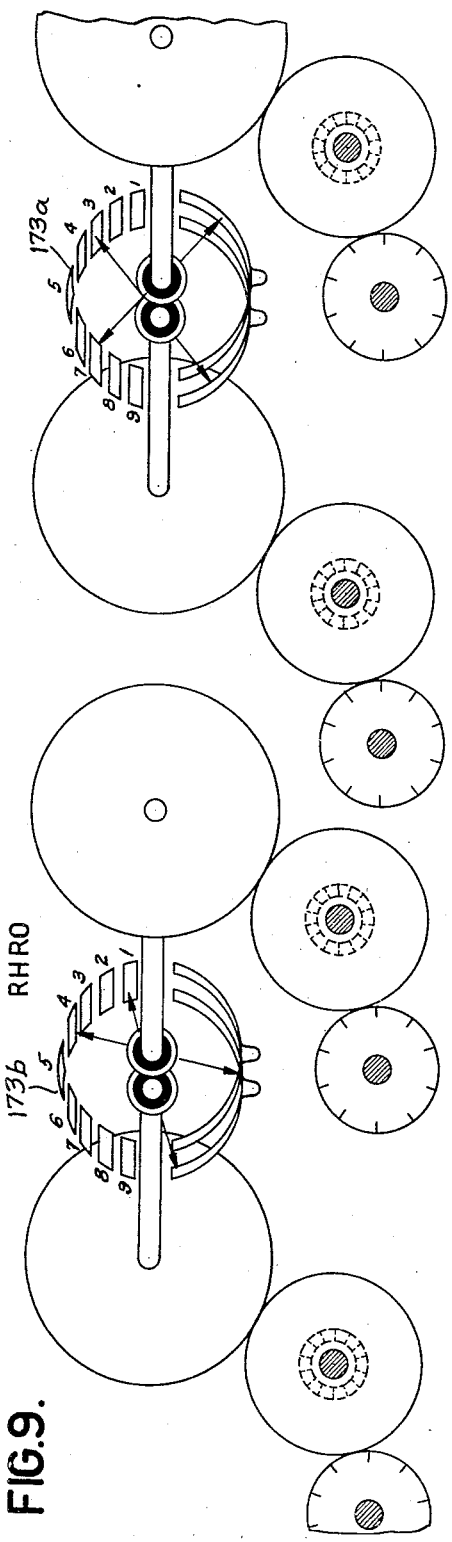
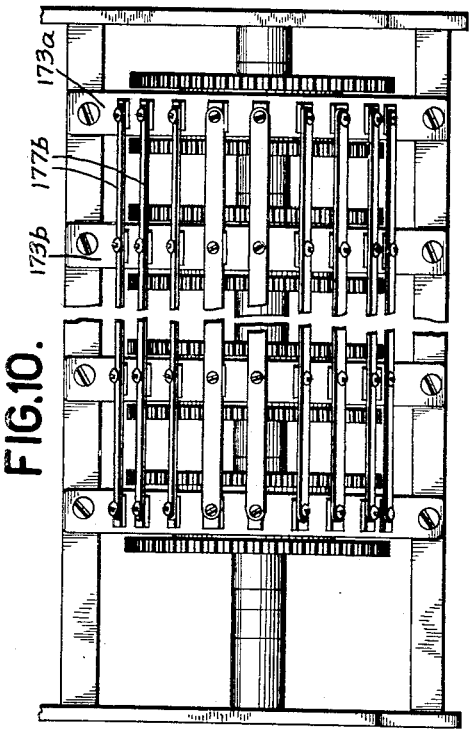
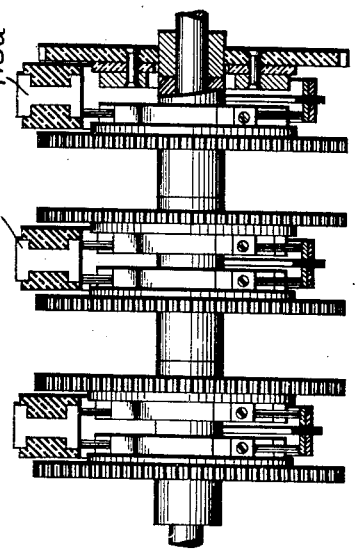
INVENTOR
James W. Bryce
BY
Cooper, Kerr & Dunham
ATTORNEYS Aug. 22, 1939.  J. W. BRYCE  2,170,543
KEY PUNCH MULTIPLYING MACHINE
Filed Oct. 4, 1932  15 Sheets-Sheet 8
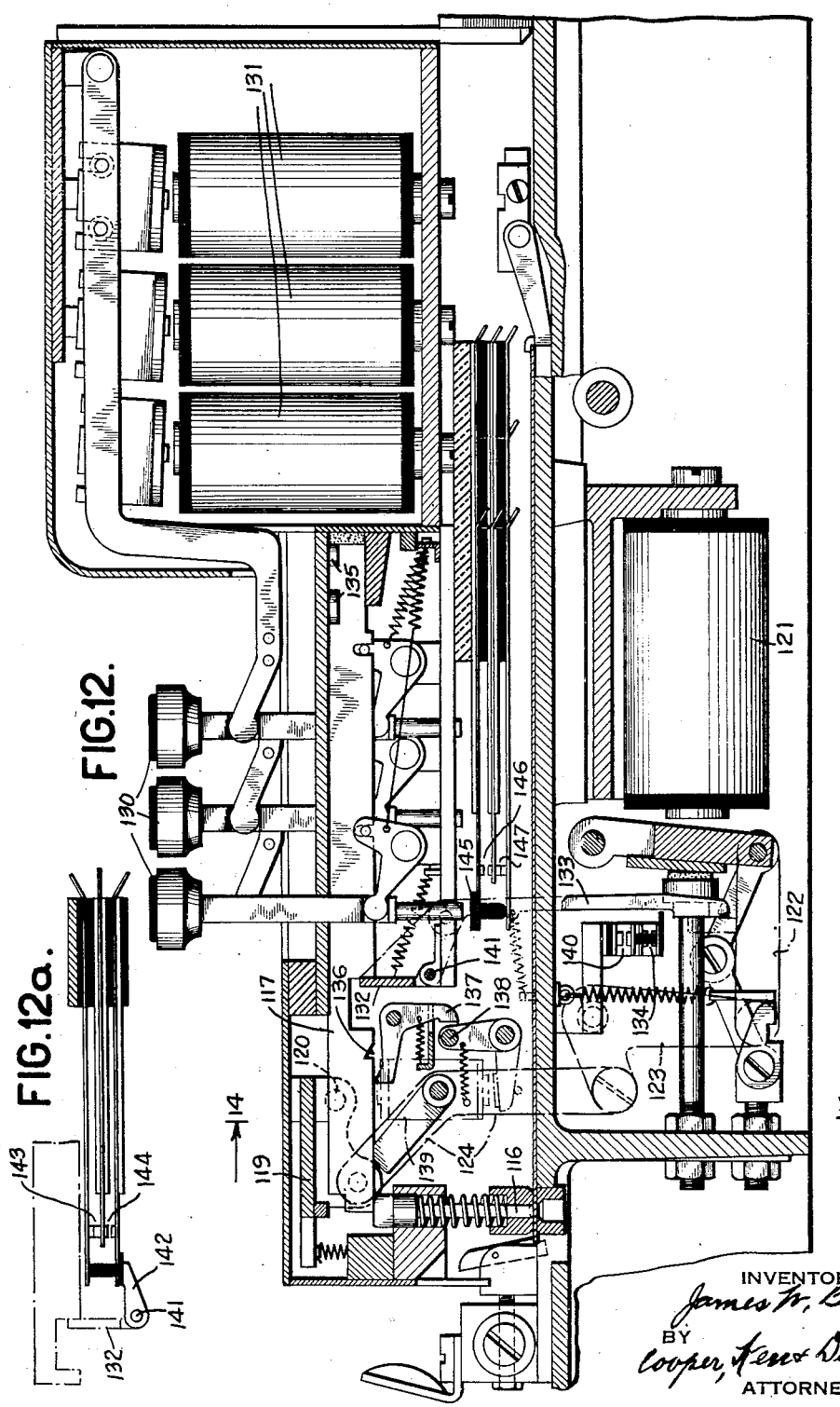

Aug. 22, 1939.   J. W. BRYCE   2,170,543
KEY PUNCH MULTIPLYING MACHINE
Filed Oct. 4, 1932   15 Sheets-Sheet 9
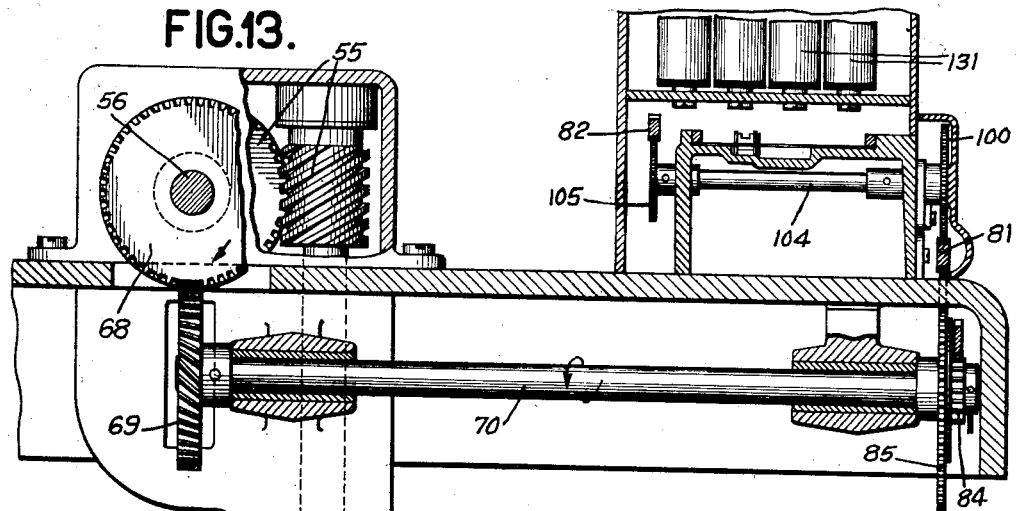
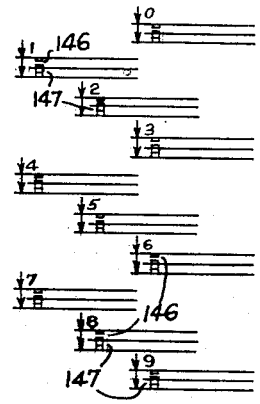
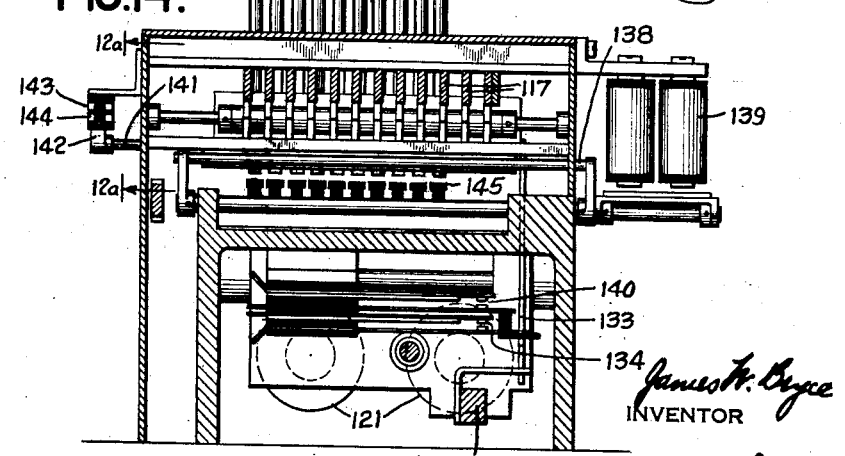
James W. Bryce
INVENTOR
BY
Cooper, Kerr & Dunham
ATTORNEYS

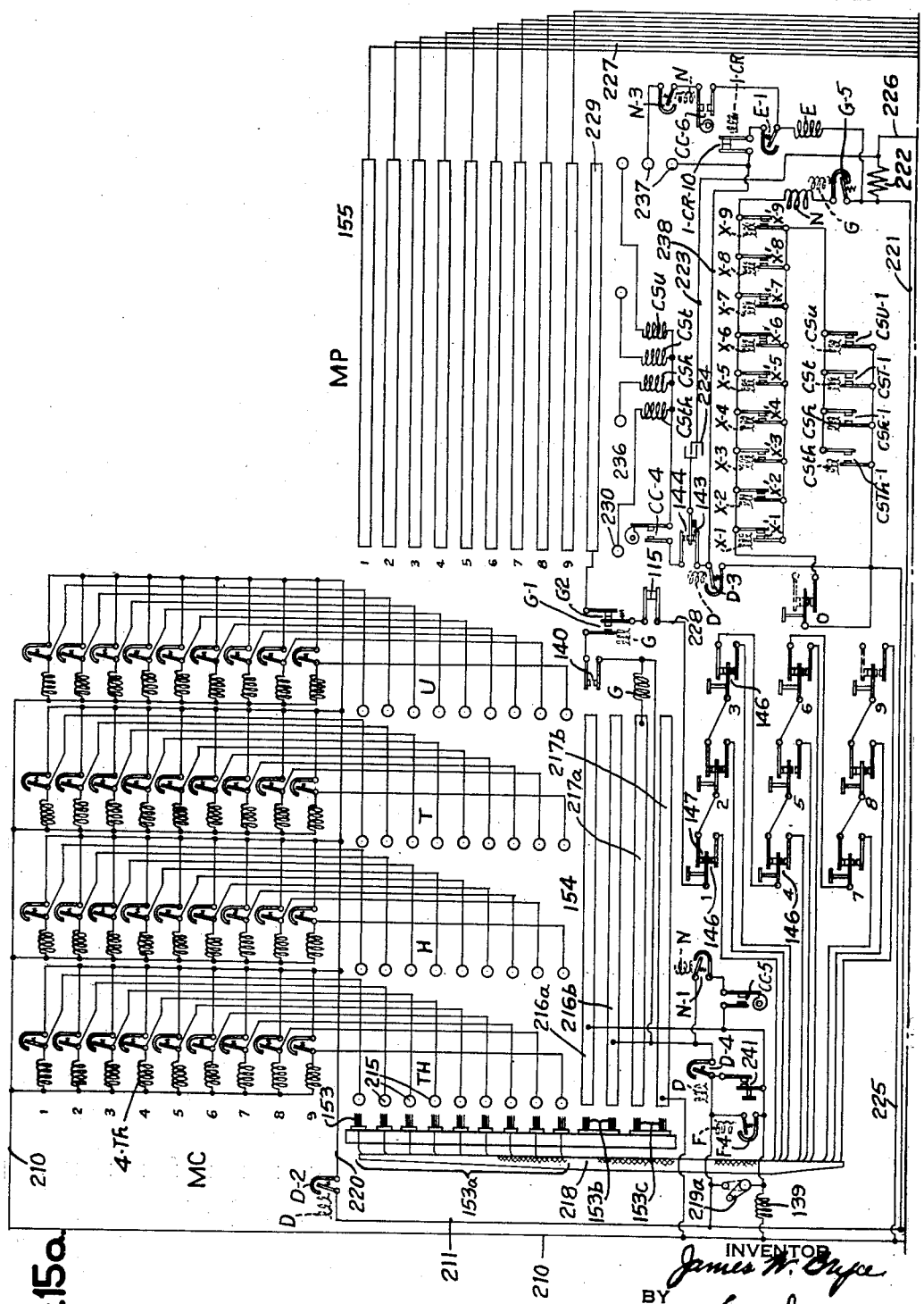

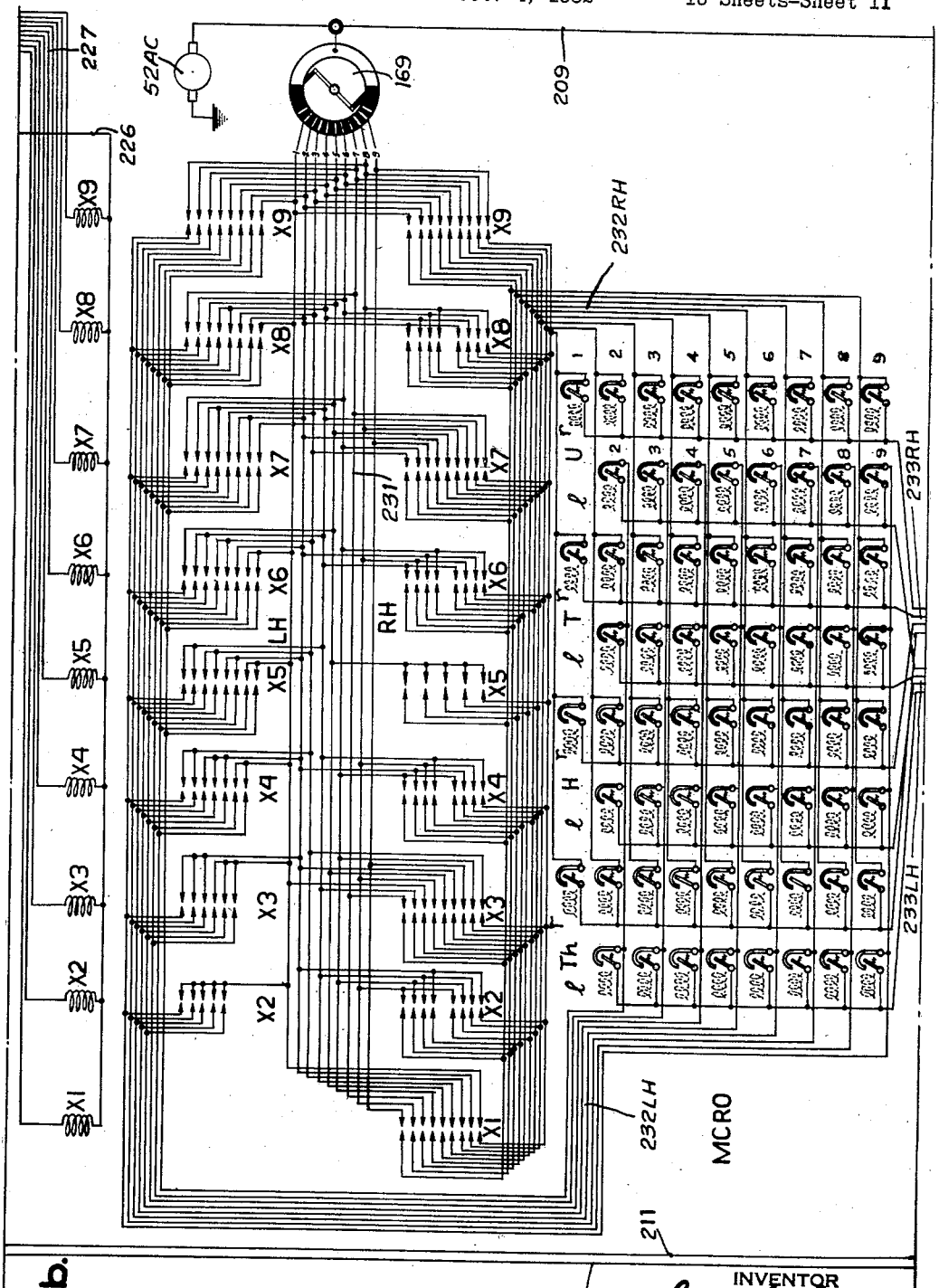

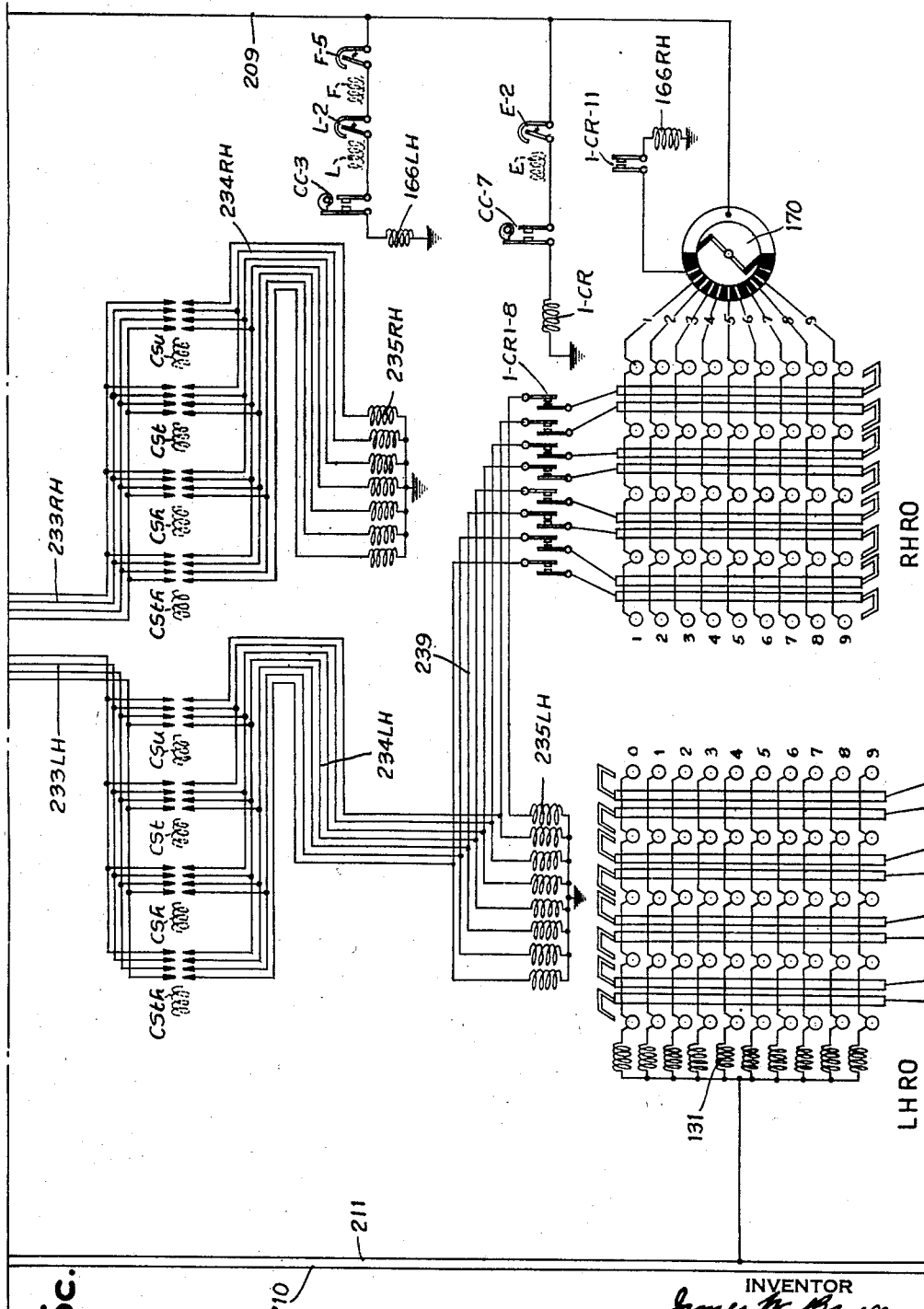

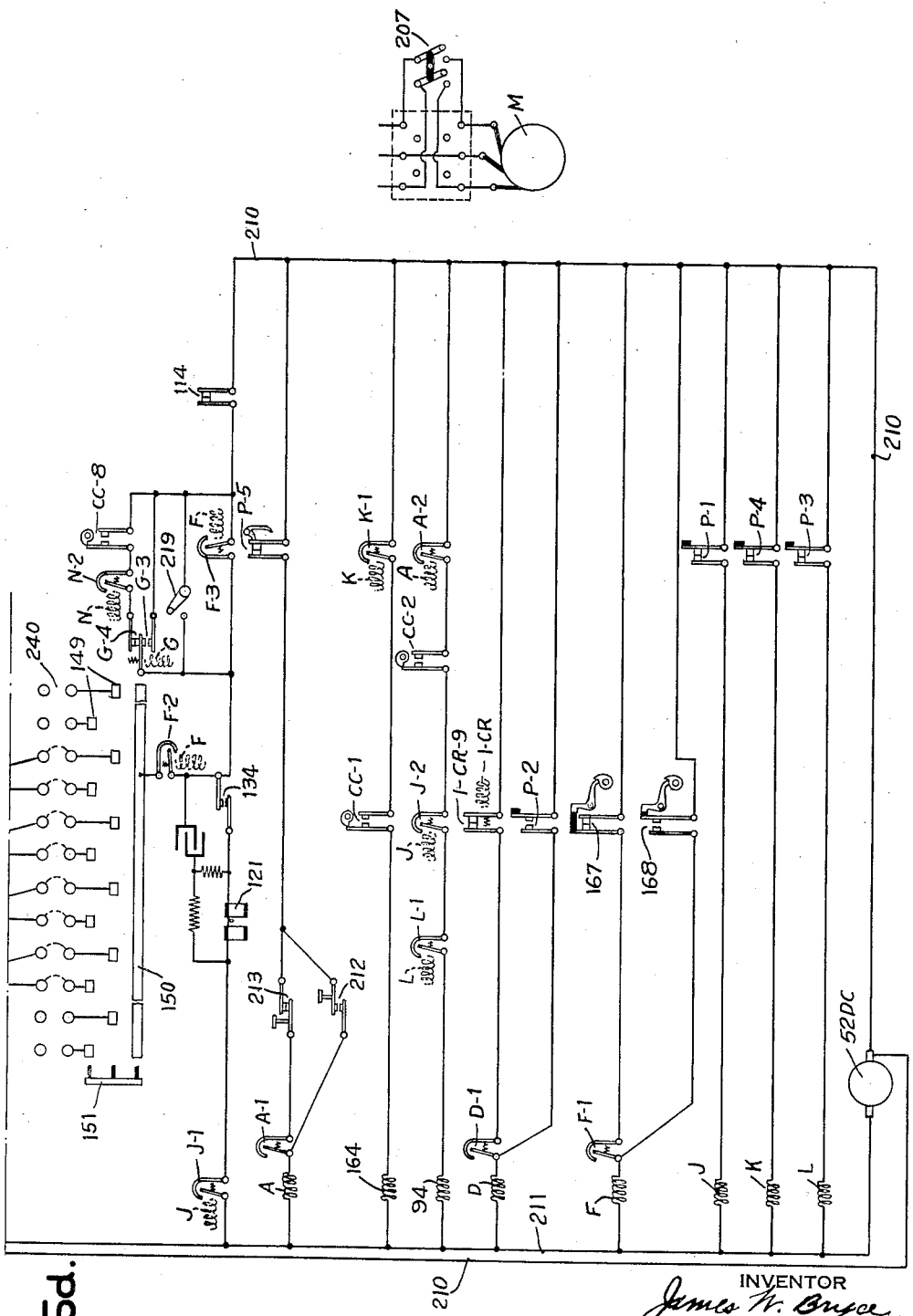

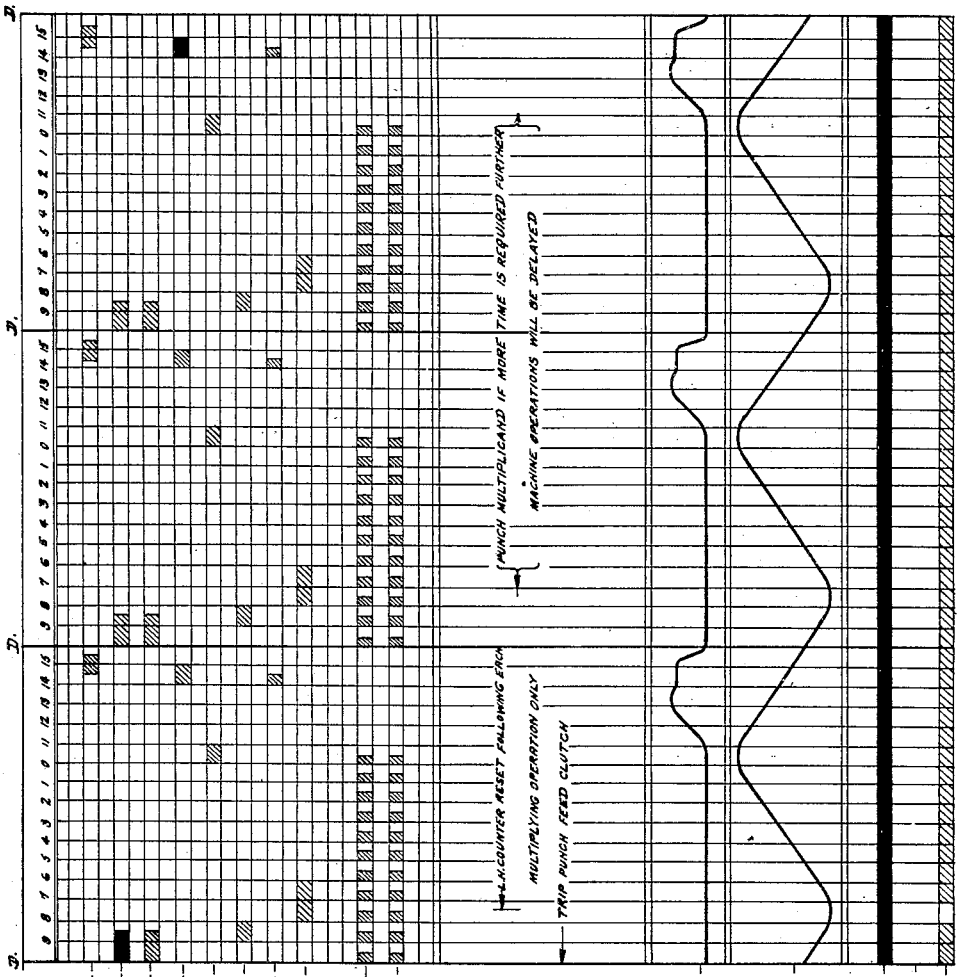

Aug. 22, 1939.　　　J. W. BRYCE　　　2,170,543
KEY PUNCH MULTIPLYING MACHINE
Filed Oct. 4, 1932　　　15 Sheets-Sheet 15

INVENTOR
James W. Bryce
BY
Cooper, Kerr & Dunham
ATTORNEYS

Patented Aug. 22, 1939

2,170,543

UNITED STATES PATENT OFFICE 2,170,543

KEY PUNCH MULTIPLYING MACHINE

James W. Bryce, Bloomfield, N. J., assignor, by mesne assignments, to International Business Machines Corporation, New York, N. Y., a corporation of New York Application October 4, 1932, Serial No. 636,109

14 Claims. (Cl. 235—61)

In my copending application, Serial No. 244,594, filed January 5, 1928, a machine was shown wherein a punching unit was provided with an associated computing mechanism. Provision was made for punching record cards with factor data pertaining to the amount of the multiplier and multiplicand and as this factor data was entered the multiplicand was stored in an entry receiving device which was in the form of a counter. Subsequently on the punching in of the multiplier the amount of the stored multiplicand was multiplied by the amount of the multiplier, column by column as the multiplier amount was punched on the card. Upon the completion of the entry of the multiplier, provision was made for automatically reading back and punching upon the record the computed product. With the machine of the aforesaid application the computing mechanism involved combinational set-up product representing devices of a rather complicated nature. The card handling section of the punch furthermore was hand controlled so that the operator of the machine in punching up and computing a succession of record cards had to perform certain card handling operations entirely by hand after one computation had been completed and before starting to punch up a card for a succeeding computation.

The present invention has for its general objects a simplification of the previous machine and the provisions of an improved structure, the elimination of the combinational product representing devices, the provision of automatic card handling means in the punch in lieu of manual card handling devices and in general the provision of a machine wherein less skill is required on the part of the operator in effecting computing operations than with the previous machine above referred to.

Other objects of the present invention relate to the provision of improved inter-control circuits and improved automatic operation initiation circuits for the machine to the general end that accuracy of results may be obtained by relatively unskilled operators.

Further and other objects of the present invention will be hereinafter set forth in the accompanying specification and claims and shown in the drawings, which show by way of illustration what I now consider to be a preferred embodiment of the present invention.

In the drawings:

Figure 1 is a top plan view of the machine;

Figs. 2 and 2a taken together show diagrammatically certain of the elements of the machine including the accumulating devices, the multiplier, column shifting and other controlling multicontact relays and the drive therefor;

Fig. 3 shows somewhat diagrammatically the arrangement of the readout device which is used for the left hand accumulator of the machine;

Fig. 4 is a fragmentary top plan view of this readout;

Figure 7:
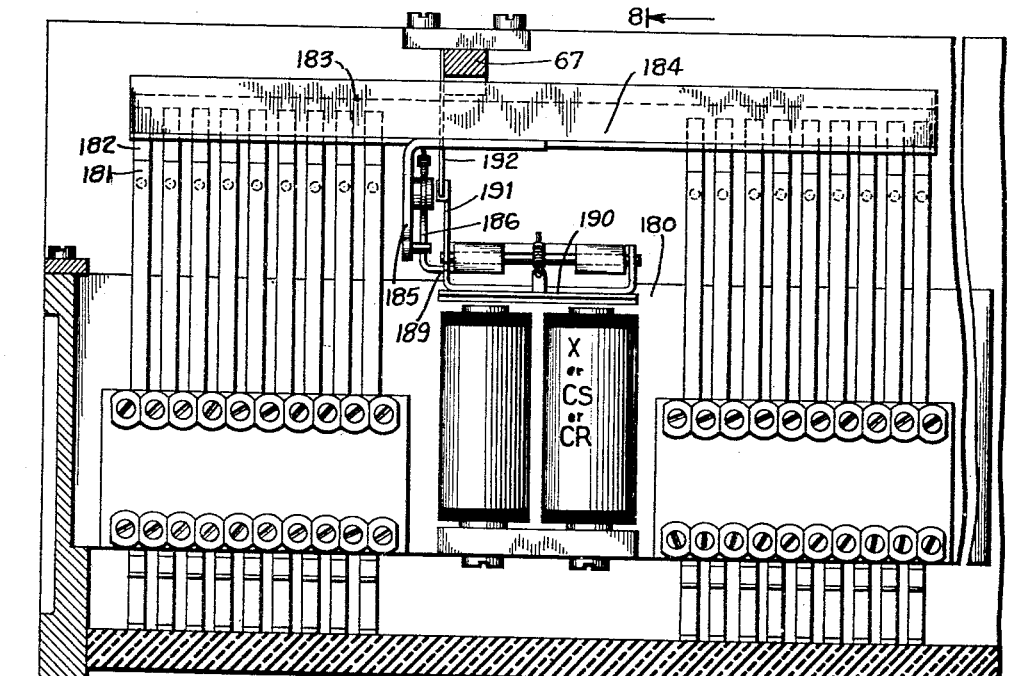
Figure 8:
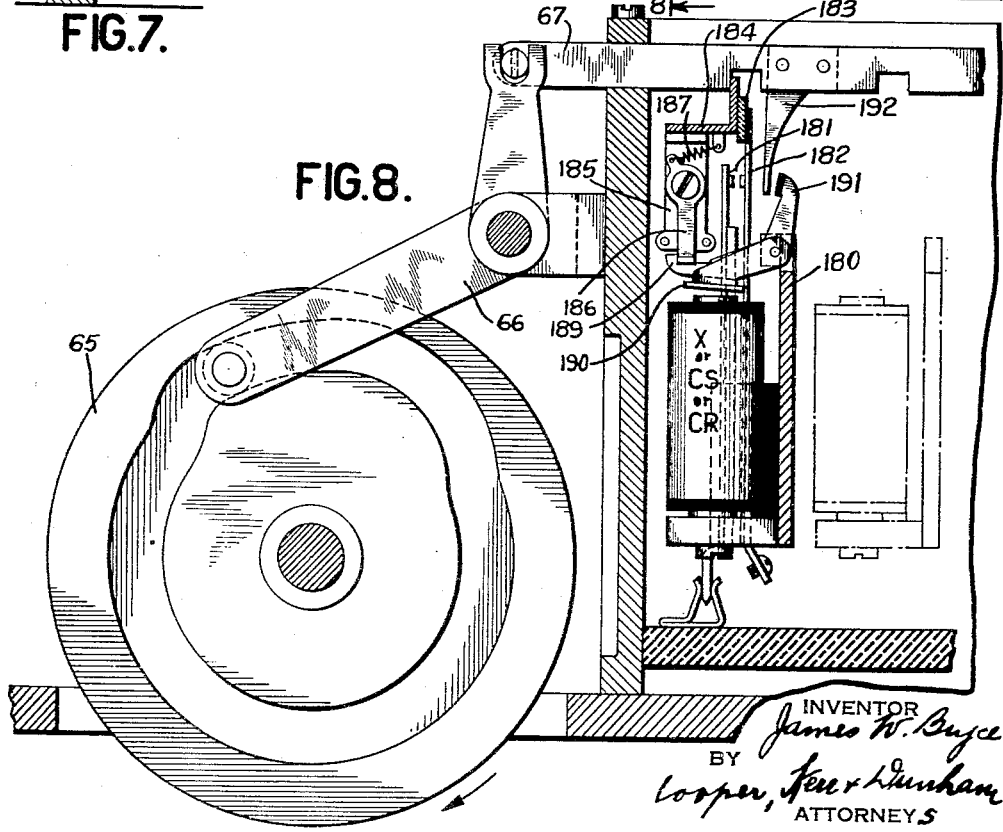

Figs. 5 and 5a taken together show a somewhat diagrammatic view of the punching section of the machine;

Fig. 6 is a sectional detail of certain parts of the punching mechanism;

Fig. 7 is an elevational view of one of the power positioned electromagnetically controlled multi-contact relay devices which are used in the machine. Such multi-contact relay devices are used for multiplication selection, column shift and for other control purposes where multiple circuits are to be established or broken concurrently;

Fig. 8 is a detail sectional view taken substantially on line 8—8 of Fig. 7 and showing a multi-contact relay in a preliminary moved and displaced position preparatory to being electromagnetically tripped and with the strain relieved from the latch point of the relay;

Fig. 9 shows somewhat diagrammatically the arrangement of the RHRO (right hand accumulator) readout device;

Fig. 10 is a top plan view of this readout and

Figure 16B:
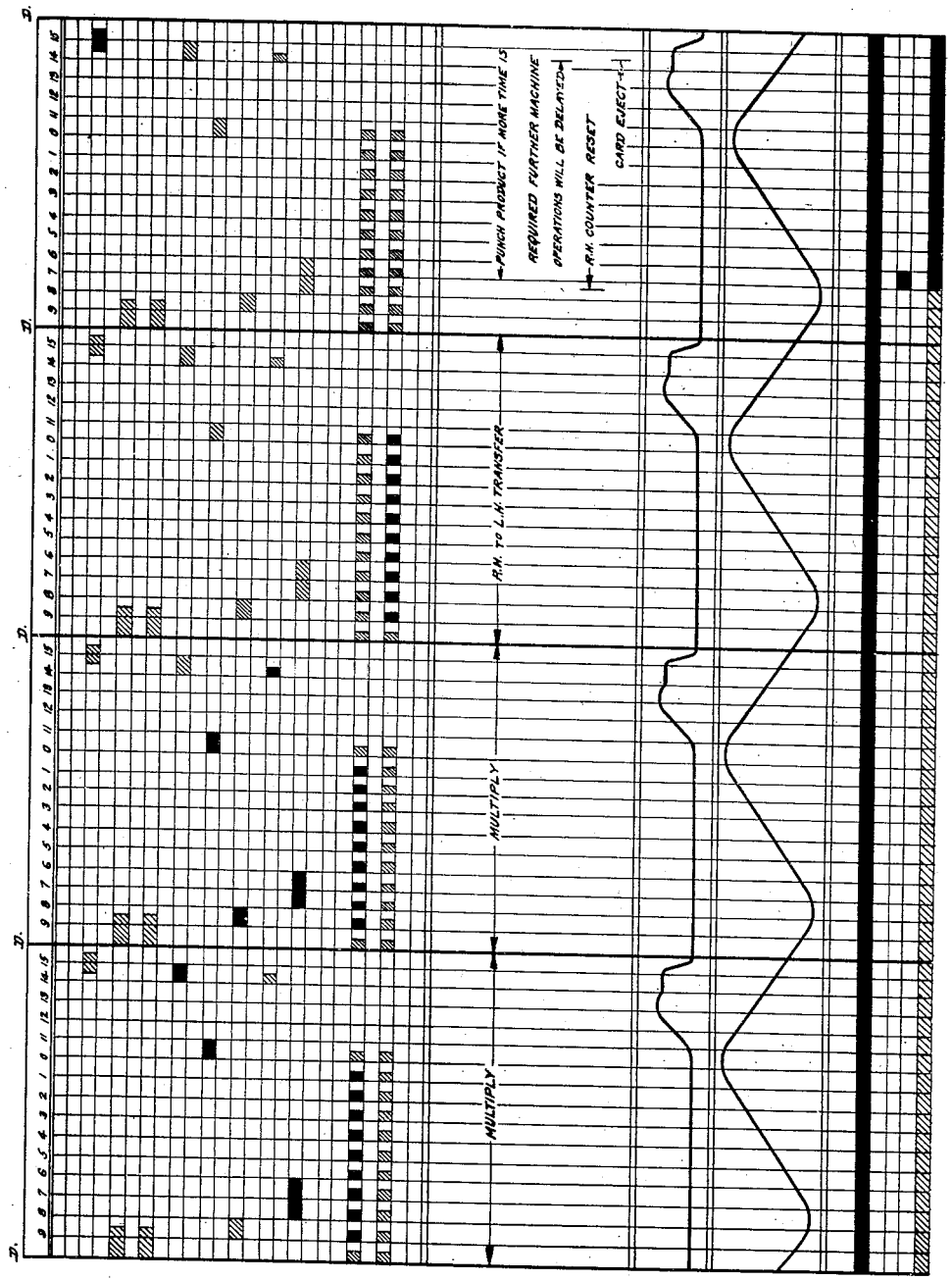

Fig. 11 is a detail sectional view;

Fig. 12 is a transverse sectional view of a portion of the punching mechanism of the machine and this view also shows the arrangement of contacts operated by the keys of the punch. The section is taken substantially on line 12—12 of Fig. 1;

Fig. 12a is a detail view of certain controlling contacts on the punch, the view being taken substantially on line 12a—12a of Fig. 14 and looking in the direction of the arrows;

Fig. 12b is a diagrammatic view showing the contacts operated by the key stems of the key punch;

Fig. 13 is a detail sectional view showing certain driving shafts and the drive to the punching mechanism. The section is taken substantially on line 13—13 of Fig. 1 and looking in the direction of the arrows;

Fig. 14 is a vertical sectional detail of the punch, the section being taken on line 14—14 of Fig. 12;

Figs. 15a, 15b, 15c and 15d taken together and arranged vertically in the order named, show the complete circuit diagram of the machine; and Figs. 16a and 16b taken together show the timing diagram of the machine.

Before describing the details of the various parts of the machine, a general description will be given of the various units and their location in the machine. The machine embodies a card handling and card punching mechanism which is shown in the lower right hand corner of Fig. 1 and also shown in Figs. 5 and 5a. This punch is of the automatic repetition punching column by column type and is provided with a card magazine from which the cards are withdrawn one by one and advanced past the punching station and finally discharged into a discharge magazine which is shown at the extreme left in Fig. 1. The punch is of the ten key successive column punching type.

Figure 1:
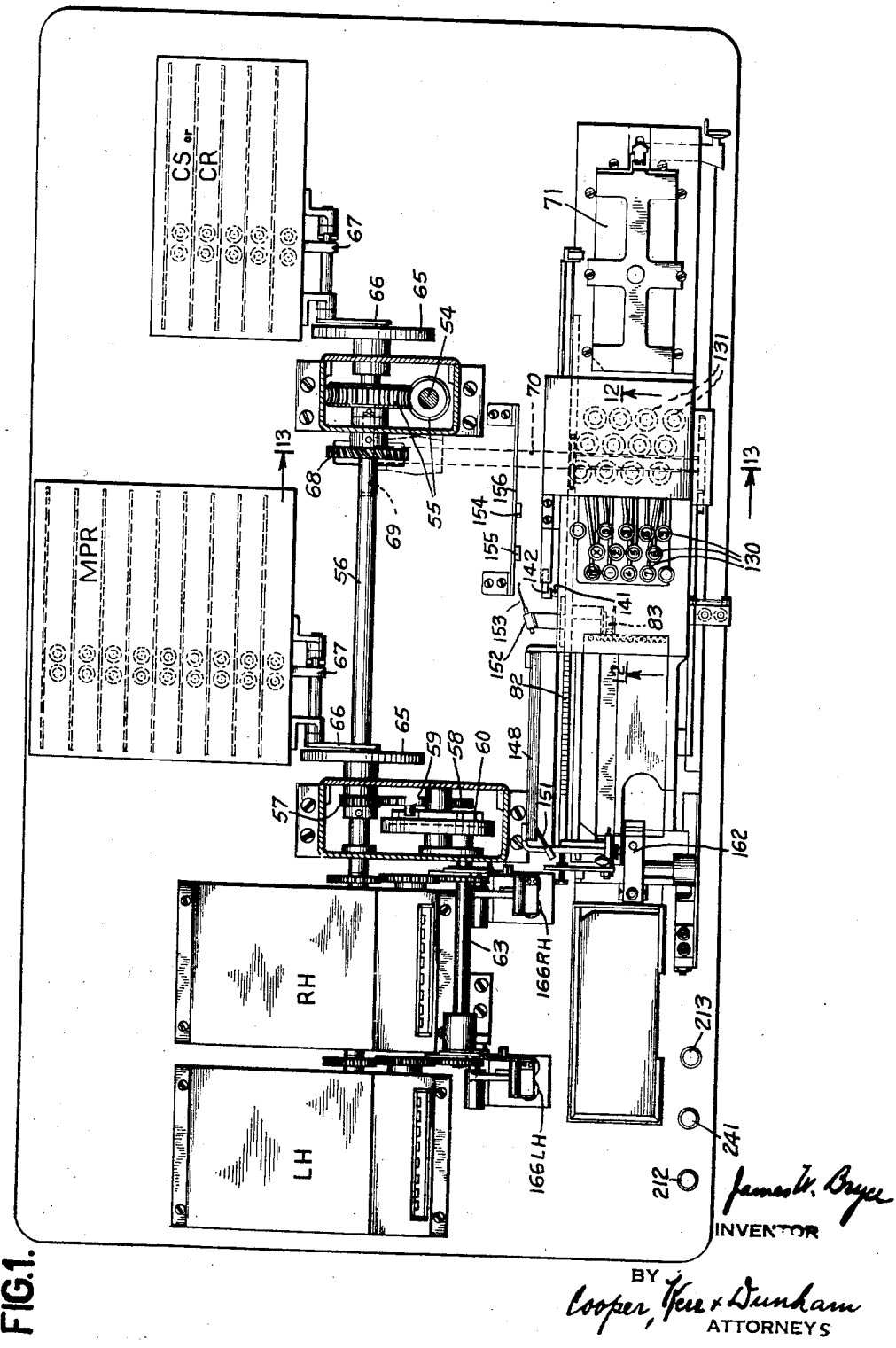

The machine also includes two accumulators which are shown in the upper left hand corner of Fig. 1 and in Fig. 2. One accumulator is designated LH for receiving left hand components of partial products and the other accumulator is designated RH for receiving right hand components of partial products.

The machine also includes a multiplying panel relay unit shown in Figs. 1 and 2 and designated MPR. There is also provided a column shift unit generally designated CS and certain additional multi-contact relays generally designated CR are located in the CS section of the machine (see Fig. 2a). The machine also includes a number of emitter mechanisms and certain cam contact devices which will be subsequently described.

Machine drive

The machine is adapted to be driven by a constantly running motor M (Fig. 2a). This motor through a belt and pulley and ratchet drive drives a shaft 51 which shaft in turn drives an A. C.-D. C. generator 52. The generator 52 is adapted to produce alternating current impulses for actuating various accumulators and relay magnets. The generator 52 also has a D. C. (direct current) take-off section. Shaft 51 through worm gear drive 53 drives a vertical shaft 54 which shaft drives the accumulator unit, the MPR unit and the CR and CS units. Shaft 54 at its upper end through worm gearing 55 is adapted to drive the accumulator drive shaft 56 of the machine. The LH and RH accumulators are driven from this accumultor drive shaft in the customary manner. Reset of the accumulators is provided for as follows. Shaft 56 is provided with a spur gear 57 driving a gear 58 with a four to one driving ratio. Gear 58 has extending from it four Geneva pins 59 cooperating with the other or cross element of the Geneva designated 60. Secured to element 60 is an internal gear 61 cooperating with a spur gear 62 mounted on the end of the reset shaft 63. The usual electromagnetic reset clutches provide for the reset of the LH accumulator and the RH accumulator.

Shaft 56 also drives operating cams 65 (Figs. 2 and 2a) which cams are adapted to operate bell crank follower members 66 and slidably shift serrated operating bars 67 for the multi-contact relay devices.

Punching machine drive

Referring to Fig. 2a, a gear 68 on shaft 56 drives a gear 69 fast to a shaft 70 (see also Fig. 13). The punching mechanism generally is of the form shown in Lee and Phillips United States Patent No. 1,772,186, and also in the form shown in United States patent to Lee and Daly, No. 1,976,618, dated October 9, 1934. Certain features of the punch are also shown and more fully described in United States patent to George F. Daly, No. 1,950,485, dated March 13, 1934. Other features of the punch are shown in patents to Schaaff No. 1,803,979, dated May 5, 1931, and No. 1,821,078, dated September 1, 1931.

In general it may be stated that the punching mechanism includes a supply magazine generally designated 71 in Fig. 1 and in Fig. 5a R designates a record card in the undermost position in the supply magazine 71. The punching mechanism includes two card feed racks 81 and 82. 82 has suitable pusher fingers 83 attached to an arm extending therefrom. The shaft 70, previously referred to, has a ratchet shaped clutch element 84 fixed on one end of it. Alongside of 84 is a gear 85 which meshes with the lower teeth of 81. Secured to 85 is a disk 86. Pivoted on this disk 86 is a member 87 provided with a ratchet shaped clutch tooth 88. Alongside of member 87 is another member 87b which lacks the clutch tooth. On 87 is a pin 89 overlying an arcuate segment of part 87b. The free end of 87b is connected to a toggle member 90 by means of a link 91. 90 is pivoted on disk 86 at 92. The opposite end of 90 remote from its pivot 92 is connected to a spring element 93. Spring 93 tends to hold the clutch tooth 88 out of engagement with the clutch teeth of element 84 and allows it to engage when part 90 is shifted.

For the purpose of effecting a clutching action punch clutch feed magnet 94 is provided. This magnet when energized attracts its armature, causing an arm 95 to engage a pin 96, depressing 87b and allowing 87 to descend so that the tooth 88 engages with the ratchet 84. Upon such engagement the gear 85 will be driven in a counter-clockwise direction substantially a single revolution, shifting rack 81 to the left. This action through the card pusher shown in Fig. 5a withdraws a card from the card magazine 71 at the R position and moves it to the R—1 position.

At the termination of the counter-clockwise movement of gear 85 the tails 97 of parts 87 and 87b will strike a projection 98 on a fixed plate to effect the disengagement of the tooth 88 from the ratchet wheel 84. This action also restores the toggle parts to normal position.

The above driving action has wound up a spring in barrel 99. Upon disengagement of the one revolution clutch 88—84, previously referred to, the rack 81 returns to the right under the influence of the spring power of the spring in barrel 99.

The driving train to the second card carriage rack 82 will now be described. Rack 81 has its upper teeth intermeshed with gear 100. Gear 100 has secured to it a member 101 (see also Fig. 6) having a single notch or tooth disposed in the plane of a pawl 102 which is pivoted on part 103, which part 103 is fixed to the shaft 104. Shaft 104 on its opposite end has a gear 105 which meshes with the card carriage rack 82. Suitable mechanism shown in Fig. 6 controls the co-action of pawl 102 with the member 101 so that with the rack 81 in extreme right hand position the pawl 102 will be disengaged from the clutch element 101 by the rocking of part 106 in a clockwise direction by the co-action of a pin 107 with the block 108 carried on rack 81. Upon initial movement of 81 to the left the block 108 will clear the pivoted camming abutment 106 allowing a slight counter-clockwise motion of it so that 102 under spring action may rock and engage the tooth of member 101. Thereafter drive will come from 81 through gear 100, through 101 to pawl 102, part 103, to shaft 104 so that a clockwise rotational movement will be imparted to 104 and to gear 105. Rack 82 will thereupon be traversed to the right. The card carriage rack 82 will thus be shifted to extreme right hand position permitting the card pushers 83 to first ride over the surface of the card under the pushers and ultimately engage back of the trailing edge of the card at the R—1 position. Rack 82 has associated with it a spring driving device comprising the usual spring barrel generally designated 109. This spring device is wound up by the traverse of 82 to the right and causes a subsequent movement of the rack 82 to the left under spring action. Rack 82 has also associated with it the escapement mechanism 110 having a dog 110a. This escapement is of the type fully described in Schaaff Patent No. 1,426,223, dated August 15, 1922, and in the Lee and Phillips Patent No. 1,772,186. Removably secured to the card carriage rack 82 is a skip bar 111 provided with notched portions 112 which permit the skip lifter lever 113 to descend when in the notch or remain elevated when riding on the high part of the skip bar. When the skip lifter lever descends into the notches it allows the dog 110a of the escapement mechanism to cooperate with the ratchet teeth of rack 82. With the skip lifter lever 113 riding on the top of the skip bar 111, the escapement will be disabled so that the card carriage rack 82 can traverse without stopping at each card column until the notched portions 112 are reached. Thereafter there is an intermittent motion of the card carriage to the left under spring action under escapement control. When the skip lifter lever finally rides out of the notched part the card carriage rack 82 takes its full excursion of movement to the left. The location of the beginning of the first notch in the skip bar determines the position for the beginning of punching. If desired and as shown, multiple notches may be provided in the skip bar one for the multiplicand, another for the multiplier and another for the product. Or if desired a long single notch can be provided of sufficient length to permit the punching of a suitable number of columns for the multiplicand, the multiplier and product. Supplemental notches for other data can also be provided if desired.

When escapement dog 110a is lifted, certain contacts 114 and 115 are provided which are arranged to open. Contacts 114 are the customary escapement contacts and contacts 115 are supplemental contacts which are arranged to open up upon elevation of the escapement dog 110a.

The punching mechanism proper need not be fully described as it is fully set forth in Lee and Phillips U. S. patents above referred to and Lee and Daly United States Patent No. 1,976,618. In brief the punching mechanism comprises a number of punches 116 (Figs. 5 and 12) which punches are adapted to be depressed to perforate the card under the control of interposers 117. The interposers are depressed by an operating bail 119 pivoted at 120. Interposer operating bail 119 is magnetically operated by means of the punching magnet 121. The connections to the bail 119 from the armature of the punching magnet 121 are by means of a link 122, bell crank 123, in turn connected to a link 124, which in turn is connected to rock bail 119 anti-clockwise about its pivot. The interposers 117 are selectively thrust forward to bring about punching action by means of the usual punch keys 130 or by the energization of punch selector magnets 131. The energization of magnet 121 is effected under interposer control. Under interposer action, a bail 132 is adapted to be rocked upon the thrusting forward of any interposer. Rocking of the bail 132, through a link 133, is adapted to close contacts 134 and bring about an energization of magnet 121. As is customary in machines of this class, the contacts 134 immediately open after the magnet 121 has been energized and attracted its armature and brought about a punching operation.

As is customary in machines of this class provision is made for preventing the concurrent depression of two punch keys with the concurrent thrusting forward of two interposers. The interlocking devices that are provided are generally designated at 135 and corresponding to the interlocking devices shown in Fig. 13 of Schaaff United States Patent No. 1,803,979. In the punching mechanism provision is made under certain conditions to prevent too early restoration of the interposers 117 to normal right hand position. Such control is provided in the following manner. Each interposer is provided with a notch 136, adapted to receive a spring pressed pawl 137 upon the advance of the interposer to the left. Such pawl prevents the return movement of the interposer until the pawl is withdrawn from the notch. Withdrawal of the pawls from the notches of all the interposers is effected by bail 138 which is adapted to be rocked by a magnet 139 (see also Fig. 14).

In the present machine supplemental contacts 140 are provided, which contacts are normally open con acts and which are closed concurrently with contacts 134 and are opened concurrently with the opening of contacts 134. The bail 132 which is adapted for the control of contacts 134 and 140 also operates certain supplemental contacts which are on the outside of the machine (see Figs. 14 and 12a). For this purpose the shaft 141 which carries the bail 132 has a contact operating arm 142 secured thereto adapted upon the rocking of the bail 132 to shift the three-blade contact so as to open contacts 143 and close contacts 144.

Each of the digit keys of the punch and the zero key is also adapted to operate an individual set of three-blade contacts. The lower stem of each key shank (see also Fig. 12b) cooperates with an insulated member 145 so that upon the depression of any punch numeral key a pair of contacts 146 will be closed and a pair of contacts 147 will be opened. It will be understood that each digit key of the punch is adapted to operate an individual set of such three-blade contacts.

Referring again to Fig. 5, disposed alongside card carriage rack 82 and fixed to the frame of the machine, is a block or strip of insulating material 148. Disposed in this block of insulating material are a number of spots 149 of conducting material and alongside these spots is a common strip of conducting material 150. A suitable bridging piece or multiple brush assembly 151 is carried by the card carriage rack 82 and as the card carriage rack moves the bridging brush 151 is displaced and establishes circuit connections from the common bar 150 to a particular one of the spots 149 depending upon the columnar position of the card carriage rack 82. For accuracy of spacing, the conducting spots 149 are placed in two rows, the spots of the lower row being inter-staggered with the spots on the upper row.

Referring to Figs. 5 and 5a, rack 82 carries an arm 152 which carries a number of brushes 153a suitably insulated from each other and from the bracket 152 are also carried a pair of brushes 153b and another pair of brushes 153c. The brushes 153a, 153b and 153c are adapted to be traversed upon the movement of the rack 82 over two stationary commutators one commutator is designated 154 and the other 155. The stationary commutators can be set in any desired position in accordance with the fields of the card which are to receive multiplicand and multiplier perforations. To permit the shifting of the stationary commutators they are mounted in upper and lower frame members 156 provided with a number of tapped holes to receive the commutators in various selective positions corresponding to the columns of the card. Members 156 are stationary members attached to the frame of the machine (see Fig. 1).

Card ejector

Referring to Fig. 5 after the card has reached the R—1 position and has been traversed past the punches 116 and has been punched, it ultimately reaches a position at the extreme left hand end of the punching section of the machine from which point it must be discharged into a discharge hopper. The card eject mechanism is shown in Fig. 5 with the parts shown in the position which they assume before the machine was started in operation. Upon the first card feeding operation, rack 81 will have moved towards its extreme left position. After reaching the dotted line position shown in Fig. 5, 81 moves further to the left and thrusts a rack 157 to the left compressing coil spring 158. Bearing against a shoulder on the rack 157 is a contact operating part 159. When 157 is thrust to the left contacts P—3 which were previously closed will open under their own spring action. The displacement of 157 to the extreme left position will, through intermediate gears 160 rock a shaft 161 in a clockwise direction to bring the ejector clip assemblage 162 away from the position shown in Fig. 5 to a position in which the ejector clip can receive a card which has been advanced through the punching section of the machine. With the ejector clip assemblage 162 disposed in such card receiving position the assemblage will be latched in such position by a latch 163. The latch 163 is adapted to be released by an eject magnet 164. Upon energization of the eject magnet 164 the ejector clip assemblage 162 has grasped a card, swings from the card receiving position to the position shown in Fig. 5, in which position the jaws of the ejector are opened up so that a card can be discharged therefrom.

Contact devices in the punching section of the machine

Contact devices P—3 controlled by 157 have been described. Also at the discharge magazine end of the punch are contacts P—4. An extension 165 on the rack 82 is adapted to close contacts P—4 when the rack 82 has passed beyond the last card column position and to allow these contacts P—4 to open when the rack 82 moves to the right to any of its other positions.

Referring to Fig. 5a, contacts P—1 are provided, which contacts are normally closed contacts arranged to open upon the rack 81 moving away from this extreme right hand position. Contacts P—2 are contacts which are adapted to be closed when the rack 81 reaches its extreme left hand position. Contacts P—5 are also provided, the same being card magazine contacts which are adapted to be closed when any cards are in the supply magazine and to automatically open up upon exhaustion of cards from the magazine.

Accumulators

The LH accumulator and the RH accumulator (see Fig. 2) are of the usual type as customarily used in tabulating machines and are provided with electromagnetically actuated clutches. The LH accumulator is provided with a reset magnet 166LH to control the reset of the accumulator from the reset shaft 63 and the RH accumulator is provided with its reset magnet 166RH. Contacts 167 are associated with the LH accumulator and such contacts are arranged to be opened upon the reset of the accumulator and to reclose when the reset is complete. Contacts 168 are associated with the RH accumulator and are arranged to close upon the reset of the accumulator and to reopen upon completion of the resetting operation.

Two emitters of conventional form are provided designated 169 and 170 respectively, with their brush assemblages driven from the main accumulator drive shaft 56. The customary cam contacts are likewise provided driven from the shaft 56 and the cams of these contacts are designated CC—1 to 8.

Readout devices

Fig. 3 shows the arrangement of the readout device for the LH accumulator. In this readout the units clutch gear train 171 drives a units brush 172U which cooperates with a set of segments 173 and which brush receives current from the common conducting segment 174. Also cooperating with the segments 173 is a brush 172T which brush assemblage is driven from the tens order clutch train 175. Brush 172T cooperates with a current supply segment 176.

It will be noted that the segment 173 is provided with nine numbered spots and a zero spot.

The wiring of the readout will hereinafter appear in connection with the description of the circuit diagram but it will be stated that the spots are transversely connected by buses 177 (see Fig. 4).

Referring now to Figs. 9 to 11 inclusive, the RH readout is substantially the same so far as its drive is concerned as the LH readout. The difference in the readout arrangement is in the relation of the spots on the segments. On Fig. 9 the segments are designated 173a and 173b and it will be noted that there are only nine conducting spots provided, no zero spot being employed.

The various segments of the readout are transversely wired by buses 177b (see Fig. 10).

Multiplying panel, column shift and multiple circuit controlling relays

Numerous electromagnetically controlled and mechanically positioned and restored multi-contact relays are used in the machine. The construction of these relays is shown in Figs. 7 and 8. Suitable side frame plates are slotted to receive a number of vertical plates 180. Carried on each plate 180 is a magnet which will be designated CS when the relays are used for column shift purposes and X—1, X—2, and X—3, etc., when the relay is used for multiplier selection purposes and CR when the relay is to be used for simple multiple circuit control purposes. These magnets CS, X or CR when energized, serve to control the establishment or breaking of circuits at the multi-contact points of the relay. The magnets are preferably used as trip magnets only and the armatures of these magnets are not required to shift their related contacts.

As previously explained, the cams 65 shift their respective followers 66 and transversely shift the serrated operating bars 67. Each plate 180 in addition to providing the mounting for the magnets CS, X or CR also affords a mounting for contacts which will be generally designated 181 and 182. Contacts 182 at their upper ends have fastened thereto a strip of insulating material 183 which strip in turn has secured to it an L-shaped member 184. The member 184 has an upper portion which engages into the downwardly extending serrated notches of the serrated bar 67. Member 184 also has downwardly depending from it and fixed thereto a bracket 185 which in turn has pivotedly mounted on it a latch member 186. This latch member has slight limited rocking movement between limiting stop pins and is normally urged clockwise by a spring 187. The lower end of the pivoted latch member 186 cooperates with a latch piece 189 fixed to a pivotally mounted armature 190. The armature member 190 also has an upwardly extending tail portion 191 arranged in cooperative relation with a restoring abutment 192 carried upon and depending from the serrated operating bar. With the parts shown in the position of Fig. 8, the cam 65 has shifted its follower 66 and shifted the serrated operating bar 67 to a position in which the contacts 181 and 182 are kept open and to a position in which the strain is removed between the latch 186 and the latch point 189, of the armature assemblage. The relay magnet may now be energized and upon being energized the latch portion 189 will be lowered allowing the latch 186 to trip over the top of the latch point, thereafter upon further rotational movement of the cam 65, the serrated operating bar 67 moves to the left and allows contacts 182 to close under their own spring action and establish contact with 181. After a set of multi-contacts have been tripped and closed in the above manner, the operating cycle of the machine ensues and subsequently the cam 65 again shifts its follower, causes the operating bar to take a somewhat larger extent of movement to the right to cause the armature knockoff bracket 192 to intercept 191 and rock the armature assemblage in a clockwise direction to knock off any previously attracted armature. Subsequent movement of the cam allows the serrated operating bar to move back to the position shown in Fig. 8. If a given magnet is not energized, its corresponding armature will not be attracted and the latch member 189 will then prevent a closure of contacts 181 and 182.

In the foregoing description the contacts generally designated 181 and 182 have been described as normally open contacts. Such contacts may also be of the normally closed type arranged to open up upon the energization of a controlling magnet and upon a shift of the serrated operating bar.

In the subsequent description of the wiring diagram certain contacts which have been generally designated 181 and 182 in the present mechanical description of the multi-contact relay, will be given designating reference numerals related to their associated control magnets. Thus 1—CR 1 to 11 will designate the eleven contacts controlled by the magnet 1—CR.

*General operation*

When the present accounting machine is to be used, unpunched cards are placed in the supply magazine 71. While generally wholly unpunched cards would be placed in this supply magazine, the cards in the supply magazine may have pre-punched perforations in certain columns. In the operation of the machine it is intended that the cards be punched up one by one with the amount of the multiplicand, the amount of the multiplier and that the machine receive an entry setting according to these factors which are so introduced into the machine by the operation of the punch keys.

The entry receiving means for the multiplicand, according to the present embodiment, preferably comprises a relay storage device. However, other entry retaining means could be used. After the amount of the multiplicand has been entered into the multiplicand entry receiving device the operator proceeds with the punching of the multiplier. As the multiplier is entered into the machine, column by column, multiplying proceeds. For example if the first column of the multiplier were 8 the machine would multiply the amount standing in the multiplicand entry receiving device by 8, create partial products in left and right hand components and introduce these components concurrently into the LH accumulator and the RH accumulator. Thereafter upon a further punching operation, say by 7 in the next column of the multiplier there would be a multiplication of the multiplicand amount by 7 and the left and right hand components of partial products would be introduced as before in proper columnar relation into the LH and RH accumulators. This operation would be continued until the multiplier is completely introduced at which time the product would be completely computed. Thereafter the machine automatically accumulates in one accumulator, viz., the LH accumulator, the partial product accumulations from the other accumulator and when this operation is completed the machine automatically punches back the product upon the record in which the factors were manually punched by the operator of the machine.

In the present machine, all card handling operations are automatic, the machine automatically presenting a new card in position for punching and automatically ejecting the card after the product has been punched thereon and then automatically introducing a new card for a new operation thereon.

*Circuit diagram*

Before starting up the machine the operator places a supply of cards in the card magazine. The main line switch 207 is closed and supplies current to the driving motor M. Motor M drives the A. C.-D. C. generator 52 and supplies alternating current impulses to the bus 209 and to ground, and the D. C. end of this generator 52 supplies direct current to the buses 210 and 211.

Upon first starting up the machine the racks 81 and 82 will be in the position shown in Figs. 5 and 5a, that is 82 will be in extreme left hand position and 81 in extreme right hand position. Accordingly, contacts P—1 and P—4 will be closed. The closure of these contacts will cause energization of relay coils J and K respectively. The energization of relay coil K closes relay points K—1 and upon closure of cam contacts CC—1 the eject magnet 164 will become energized. Energization of 164 will release the ejector clip assemblage 162 so that it will assume the eject position as shown in Fig. 5 and this action will cause contacts P—3 to become closed. Closure of contacts P—3 (Fig. 15d) will energize relay coil L and will cause closure of relay points L—1. The cards in the card magazine 71 will have closed the magazine contacts P—5. The start key 212 may now be depressed completing a circuit through relay coil A. Energization of A closes stick relay points A—1 and establishes a stick circuit through the stop key contacts 213 and the card magazine contacts P—5. So long as cards remain in the magazine, relay coil A will remain energized.

The machine may be stopped at any time by depressing the stop key, opening up the circuit at the stop key contacts 213. A stopping operation of this sort will suppress the feeding of subsequent cards but will allow operations to be completed on cards which are already in the punching section of the machine at the time when the stop key was depressed.

The energization of relay coil A closes relay points A—2 and upon closure of cam contacts CC—2 the punch feed clutch magnet 94 becomes energized. Accordingly a card is withdrawn from the card magazine and advanced through the punch and ultimately picked up by the rack 82. At the end of the right to left traverse of the rack 81, contacts P—2 become closed. The closure of these contacts will energize relay coil D. Energization of D closes relay points D—1 to establish a stick circuit for D through relay contacts 1—CR—9 now closed. Energization of D will also close relay points D—2, D—3 and D—4 (Fig. 15a). After the card has been picked up by card carriage rack 82 it is preferably skipped under the influence of the skip bar or by the space key to the first punching position which may be considered to be the position in which the first or multiplicand factor is to be punched in the card. It may be explained that in punching the multiplicand factor, the multiplier factor and the product, the punching operations are begun with the highest order in each amount, that is punching is from left to right. For convenience in explanation it may be assumed that the computation to be performed is one of the following typical forms: 4726 times 3245 equals product. When the card reaches the position in which the highest digit of the multiplicand can be punched in the card the operator of the machine depresses the No. 4 key on the punch. Depression of this 4 key perforates the card with a perforation in the 4 index point position. With the card fed to the position for the beginning of punching of the multiplicand, the set of brushes 153a will be in contact with the row of segment spots pertaining to the thousands order of the multiplicand generally designated 215. On the wiring diagram (Fig. 15a) the 215 row of spots are shown at the extreme left for clarity on the wiring diagram, whereas on the multiplicand commutator 154 in Fig. 5 such 215 or thousands row of spots are at the extreme right. This reversal of arrangement is provided for clarity in the circuit diagram. The upper nine brushes of the 153a group cooperate with the 215 spots and the next lower pair of brushes 153b, which are wired together, cooperate with segments 216a and 216b and the next or bottom pair of brushes 153c, which are also wired together, cooperate with common strips 217a and 217b. The upper nine brushes 153a which cooperate with segment spots 215 are wired in a cable 218 and the wires of this cable connect to one side of the 146 contacts which are the key operated contacts shown and described in connection with Fig. 12.

As shown in the circuit diagram the three-blade contacts associated with the keys and controlled thereby are wired together in the following manner. The upper contact of the 147 pair pertaining to the number "1" key is connected to the center blade of the contact operated by the number "2" key and the upper contact of the 147 pair of this key is connected to the center blade contact operated by the "3" key and so on. With the brushes 153b connecting strips 216a and 216b a circuit is established from the 211 side of the D. C. line, through relay points D—4 now closed, through 216b, 153b, 216a through the interposer latch magnet 139 and back to the other 210 side of the D. C. line.

During the punching of the multiplicand, the interposers 117 are not latched in forward position because the maintained energization of the 139 magnet prevents such latching forward of the interposers. With brushes 153c connecting strips 217a and 217b relay coil G becomes energized, the return circuit being through relay points D—4 now closed. The energization of relay coil G closes relay points G—1 (Fig. 15a), G—3 (Fig. 15d) and will open relay points G—2 and G—5 (Fig. 15a) and points G—4 (Fig. 15d). For simple punching operations where the multiplicand and multiplier are to be punched by hand and the product punched by the operation of the machine a switch 219 (Fig. 15d) will be left in open position and a switch 219a (Fig. 15a) will also be left in open position. These switches are provided to permit punching of supplemental amounts by hand in other than the multiplicand and multiplier and product fields of the card and they are closed when hand punching is desired in such other fields. With the switch 219 open the closure of relay points G—3 establishes a circuit from the 210 side of the D. C. line through escapement control contacts 114 now closed to one side of the interposer controlled contacts 134. The closure of contacts G—1 (Fig. 15a) under the control of relay coil G establishes a circuit from the 211 side of the D. C. line through relay points D—4 now closed to one side of the supplementary interposer operated contacts 140 and from the other side of these contacts a circuit is established through points G—1 now closed through the supplementary escapement contacts 115 down through the wiring of the various key contacts to the number key which is being depressed for the highest order digit of the multiplicand. If such digit were for example 4, with the typical problem illustrated above, the circuit would be completed through the lower of the 146 pair of contacts of the 4 key back through the cable 218, out via the 4th spot of the 215 group and up to energize the number 4 multiplicand relay magnet of the thousands order, this relay magnet being designated 4Th, 4Th signifying the digit 4 in the thousands order. Upon energization of this 4Th relay, a stick circuit is established through the stick points of the relay back to the other side of the D. C. line through a wire 220 and through relay points D—2 now closed. The relay 4Th in question becomes energized upon the closure of contacts 140, which contacts become closed when a key is fully depressed. Concurrently with the closure of contacts 140 under interposer action, contacts 134 (Fig. 15d) become closed and cause the energization of the main punch operating magnet 121 in the usual way. Such contacts 134 after becoming closed, are immediately opened up by the punch operating magnet.

*Multiplicand entry receiving device*

The manner of energization of one of the multiplicand entry relays has been described.

It may be explained that in the present machine there are thirty-six of such relays provided, one for each digit in each order. The relays may be conveniently designated Th for those pertaining to the thousands order, H for the hundreds order, T for the tens order and U pertaining to the units order. The prefix numeral will signify the digit value of the points of any given relay.

The multiplicand entry relays above mentioned and as shown in the upper part of Fig. 15a, have three pairs of relay points associated therewith. One set of relay points, are the usual stick relay points and such stick points are unlettered and shown on Fig. 15a, the other relay points are shown on Fig. 15b and are respectively designated r and l, r signifying that the relay points are for controlling right hand component entries and l signifying that the relay points are for controlling left hand component entries. It may be mentioned that the r set of points in any given bank are 9 in number and the left or l set of points are 8 in number, inasmuch as the multiplication by one never requires a left hand component.

After the digit in the highest order of the multiplicand has been punched and its relay set up, the escapement operation proceeds in the usual manner and as successive orders of the multiplicand are punched the switching brush assemblages 153a, 153b and 153c traverse across the segment spots, first being on the spots pertaining to the thousands order, then on the next operation they are on the spots pertaining to the hundreds order and so on. Successive key operation will successively set up the relays in the different orders and ultimately the complete amount of the multiplicand will be set up on the multiplicand entry retaining relays and their relay points will have been shifted to represent this setup. If a zero is to be punched in any order of the multiplicand the punching is effected in the usual way for zero, but there will be no setup pertaining to zero in any order of the multiplicand relays.

In punching the multiplicand into the card and setting up the multiplicand entry retaining device, the interlocking devices on the interposers prevent concurrent depression of two keys on the punch at the same time and thus prevent erroneous setups of the multiplicand.

During the escapement of the card carriage rack in the punch from column to column the escapement control contacts 114 (Fig. 15d) and 115 (Fig. 15a) open and prevent erroneous setups or entries at this time. After the multiplicand has been completely punched and set up on the relay entry receiving device, the card carriage rack is advanced to the position for beginning the punching of the highest order of the multiplier. This can be effected under skip bar control or by space key operations. At the time the card has reached a proper position for receiving the highest order of the multiplier the brush assemblages 153 a, 153b and 153c will have traversed completely off the segment spots of the multiplicand commutator 154 and will have contacted with the strips of the multiplier commutator 155 (see Fig. 15a). After brushes 153b have ridden off the ends of strips 216a and 216b, the interposer latch magnet 139 becomes de-energized and after the brushes 153c have ridden off the ends of 217a and 217b, relay coil G becomes de-energized. The de-energization of relay coil G causes opening of relay points G—1 (Fig. 15a) and points G—3 (Fig. 15d) and will have allowed closure of G—2 and G—5 (Fig. 15a) and reclosure of points G—4 (Fig. 15d). The operator may now begin to punch out the multiplier commencing the punching as with the multiplicand with the highest order amount in the multiplier. If the multiplier amount is 3245 the first key to be depressed would be the 3 key.

*Multiplying operations and punching of multiplier*

Before describing the manner of entering the multiplier and effecting multiplication it may be explained that provision is made in the present machine for preventing the release of a given multiplier key until multiplication has been completed by the number corresponding to the key depressed. Provision is furthermore made to prevent the punching of a multiplier amount until the proper control relays have been energized for multiplier selection purposes and column shift purposes. Assuming the 3 key to be the first multiplier key depressed, the action is as follows. Referring to Fig. 15a there is a circuit 221 which leads from the 211 side of the D. C. line to a resistance 222 and from this resistance a wire 223 leads to one side of a condenser 224. The other side of the condenser 224 is in a circuit to the center blade of contact pairs 143 and 144 and from the other side of the 143 contact pair a circuit leads through relay points D—3 now closed and back to the other side of the D. C. line 210, through wire 225. This circuit just traced is for charging the condenser 224. Assume the 3 multiplier key to be depressed. The depression of this key will, through interposer action, open contacts 143 and make contacts 144. At the time in the cycle of operation of the machine when cam contacts CC—4 close a condenser discharge circuit will be established from the right hand side of condenser 224 down via wire 223, wire 226 (see Fig. 15b) over to the X—3 multiplier relay magnet, back to the third wire of the 227 group across to the number 3 strip of the multiplier commutator to the third brush of the 153a group, thence to the lower contacts of the 146 pair associated with the number 3 key, through these contacts, through the circuits extending through the number 2 key contacts and the number 1 key contacts out via wire 228, through escapement contacts 115 now closed, through contacts G—2 now closed, through the common strip 229 of the multiplier commutator across via brush 153b to spot 230 of the commutator and back through the CSth column shift relay magnet, through the cam contacts CC—4 and through contacts 144 now closed to the other side of the condenser. The discharge of current from the condenser upon closure of contacts CC4— will now concurrently energize the thousands order column shift magnet CS*th* and the X—3 multiplier relay magnet.

With the X—3 multiplying relay energized at the proper time in the operation of the machine, the proper X—3 multiplier relay contacts are closed and with the emitter 169 in operation impulses are emitted through the 231 group of digit lines (Fig. 15*b*) through the proper LH and RH contacts of the multiplier relays to the LH lines generally designated 232LH and to the RH lines generally designated 232RH. These LH and RH lines extend to the *l* and *r* relay points of the multiplicand entry setup device and selected impulses are allowed to flow through the multiplicand entry setup or readout device to the lines generally designated 233LH and 233RH (see also Fig. 15*c*).

It will be remembered that the CS*th* column shift relay has been energized so that a properly selected entry of impulses is afforded into the lines 234LH which lead to the accumulator magnets 235LH of the LH accumulator and the right hand component impulses are properly directed through the lines 234RH to the accumulator magnets 235RH of the RH accumulator. There will now be a complete entry of the partial products of the multiplicand amount multiplied by the highest order figure of the multiplier amount in the LH and RH accumulators.

Referring to Fig. 15*a*, in this figure there are shown supplemental sets of contacts CS*th*—1, CS*h*—1, CS*t*—1 and CS*u*—1 connected in parallel and contacts X'—1, X'—2, X'—3, etc., also connected in parallel and serially connected to the just described contacts. These contacts are extra contacts disposed respectively on the column shift and multiplier relay plates. With the illustrative computation given, the X'—3 contact will be closed and the CS*th*—1 contact will be closed so that a circuit would be established serially through both of these contacts in a path traced as follows. From the 210 side of the D. C. line, via wire 225, through CS*th*—1 contact, through the X'—3 contact, through relay coil N, back through relay points G—5 now closed, wire 221 to the 211 side of the D. C. line. The energization of relay coil N will close relay points N—1 (Fig. 15*a*) and points N—2 (Fig. 15*d*). Closure of relay points N—2 (on Fig. 15*d*) will, upon closure of cam contacts CC—8, allow current to flow from the 210 side of the D. C. line, through the escapement contacts 114 now closed, through CC—8, through N—2, through G—4 now closed, to the punch operating magnet controlling contacts 134 and back through the punch operating magnet 121 and through relay points J—1 to the 211 side of the D. C. line. A punching operation now takes place to punch the amount 3 in the highest order column of the multiplier field of the card. The control just traced involving relay N and points N—2 is provided to prevent the punching in of a multiplier amount until the related multiplier relay magnet and the selected and related column shift relay magnet have been energized and their contacts shifted under control of the cam 65.

It may be explained that even though contacts 134 close before such magnets X—3 or CS*th* become energized the punch operating magnet 121 cannot become energized until relay points N—2 close under the control of the multiplier and column shift relay magnets and under control of the timed cam contacts CC—8. Accordingly, a control is provided which prevents actual punching of a multiplier amount until the proper set up has been obtained to effect multiplication by the amount subsequently punched.

The purpose of the condenser discharge circuit for energizing the X and CS magnet is to prevent repeated multiplying by the same multiplier amount in the event that the operator of the machine held a punch key depressed for several machine cycles. If the operator held such key depressed for a number of machine cycles there would nevertheless be only one energization of an X magnet and of the CS magnet. This "once energization" control is secured in the following manner. Assume that the 3 key be held depressed for a considerable period of time and for several revolutions of the cam which operates cam contacts CC—4. With the 3 key in upper position prior to being depressed, the condenser 224 receives its charge. With the number 3 key depressed contacts 143 are open and contacts 144 are kept closed and following the closure of contacts 144 and upon the closing of cam contacts CC—4 the charge from the condenser will flow over to the CS magnet and to the X magnet. This will completely discharge the condenser. Thereafter any maintained holding down of the number 3 key will not deliver any further current impulse to the CS magnet or to the X magnet, notwithstanding that cam contacts CC—4 may close one or several times. To get another impulse of current to the CS magnet and to the X magnet the operator of the machine must release the key which is being held depressed by depressing auxiliary key 241 and allow contacts 143 to reclose in order to recharge the condenser from the direct current lines.

The energization of relay coil N in the manner previously explained will have closed relay points N—1 (Fig. 15*a*) and when cam contacts CC—5 close, a circuit is established from the 211 side of the D. C. line through relay points D—4 now closed, through points N—1 now closed, through cam contacts CC—5 and back to the 210 side of the D. C. line, through the interposer latch release magnet 139. The energization of magnet 139 will release the interposer which has been previously latched forward and allow it and its associated key to return to normal position. With any interposer in latched forward position it is impossible for the operator of the machine to depress any other key because of the interlocks between the interposers. This control prevents double key depression with attendant erroneous entries.

It may be further explained that the timing of the energization of magnet 139 follows the entry of the partial product amounts into the LH and RH accumulators so that the advanced interposer and related key are not allowed to return to normal position for a new entering operation until the previous partial product entry has been completed.

The operator of the machine now proceeds to punch the next column of the multiplier. This is effected in the same manner as before and with this next key depression the brushes 153*b* will be in contact with spot 236 (Fig. 15*a*) instead of 230 as before so that the CS*h* magnet will be energized instead of the CS*t* magnet. The balance of the circuit need not be traced as it is the same for the precedingly described entry. This operation proceeds until the multiplier is completely entered and all orders multiplied by the previously entered and retained multiplicand, the next entry being for the next lower order and the following entry being for the next lower order and so on.

It may be explained that if the zero key of the punch is depressed that there is no energization of any CS or X magnets. The depression of such zero key, however, does cause the energization of relay coil N. As shown in Fig. 15a the zero key is in an independent circuit with its own set of three-blade contacts which are wired up to cause the energization of relay coil N. The zero key also is arranged to control an interposer and such interposer is latched forward just as a normal significant figure interposer would be and the cycle time for entering a zero in a column of the multiplier is the same as the cycle time for entering any significant figure in any column of the multiplier.

After the operator of the machine has entered the amount of the last and lowest order of the multiplier and the multiplication has been completed by such amount in the last order in the multiplier, the machine is ready to accumulate together in one accumulator the separate accumulations of the partial products.

Referring to Fig. 15a, with the machine in position for entering the last column of the multiplier, brushes 153c will be in contact and connect spots 237. Upon the usual key operation, relay N will ultimately become energized in the manner previously described. Relay points N—3 will have become closed and upon closure of cam contacts CC—6 a circuit is established traced as follows. From the 210 side of the D. C. line, through wire 225, through relay points D—3, via, wire 238, to the spots 237 now connected by brushes 153c, through relay points N—3, through cam contacts CC—6, to relay coil E and back via wire 221 to the other side of the D. C. line. The energization of relay coil E will close stick relay points E—1 and establish a stick circuit for E, through contacts 1—CR—10 which are normally closed. The energization of relay coil E will also close relay points E—2 (Fig. 15c) and when cam contacts CC—7 close, which is after the multiplication of the amount in the units or lowest order of the multiplier has been completed, current will flow from the 209 line to energize relay coil 1—CR. The energization of relay coil 1—CR will bring about the closure of the 1—CR 1 to 8 contacts at the proper time in the cycle of operation of the machine and with emitter 170 in action, impulses will be emitted through the RHRO readout, through the 1—CR 1 to 8 contacts and through the transfer lines 239 to the 235LH accumulator magnets and the amount standing on the RH accumulator will be entered into the LH accumulator. The energization of relay coil 1—CR, which brings about the shift of contacts 1—CR 1 to 8 also is adapted to open up contacts 1—CR—10 (Fig. 15a) to break the stick circuit for relay coil E and prevent repeated transfer of amounts from the RH accumulator to the LH accumulator. The energization of relay coil 1—CR also opens contacts 1—CR—9 (Fig. 15d) and breaks the stick circuit for relay coil D. The de-energization of relay coil D opens relay points D—1 (Fig. 15d), D—2, D—3 and D—4 (Fig. 15a). The opening of points D—2 breaks the stick circuit for the multiplicand entry retaining relays and the multiplicand entry relays are restored to normal position. The opening of relay points D—3 interrupts the charging circuit to the condenser 224 and the opening of relay points D—4 opens the circuit to the 216a and 216b segments and the circuit to relay coil G.

Reset of the RH accumulator is initiated in the following manner. Upon the brush of the emitter 170 encountering the extra spot a circuit is established from the 209 side of the A. C. line, through contacts 1—CR—11 which close following the energization of 1—CR, through RH reset magnet 166RH. Reset of the RH accumulator now occurs and upon such reset contacts 168 close and cause energization of relay coil F (Fig. 15d). The energization of F closes stick relay point F—1 to establish a stick circuit for F through the LH reset contacts 167 which are now closed.

At this time it may be explained that after the record card has received the punching for the lowest order column of the multiplier it escapes to product receiving position and is ready to receive the final product which is now standing in the LH accumulator. Upon the energization of F in the manner previously explained following the reset of the RH accumulator, relay points F—2 and F—3 (Fig. 15d) and relay points F—4 (Fig. 15a) and F—5 (Fig. 15c) become closed. The closure of relay points F—4 re-energizes the interposer latch magnet 139 so that no interposer becomes latched forward upon the following product punching operations. The closure of relay points F—3 and F—2 (Fig. 15d) establishes a circuit to the common strip 150 of the readout device on the punch and relay points F—3 also establishes a circuit to one side of the contacts 134. With the brush assemblage 151 standing on the column of the readout strip corresponding to the first product punching position a circuit is established from the common segment 150 to one of the spots 149 and through plug connections at plug board 240 to the wires which lead to the LHRO readout, thence through the readout to a particular punch selector magnet 131. The punching of the product proceeds column by column in the usual way, the brushes 151 (Fig. 15d) traversing from column to column as each column of the product is punched.

After the last column of the product is punched, the card carriage rack 82 will escape to beyond the last column position under skip bar control or by space key or other key action and ultimately contacts P—4 become closed. Closure of these contacts (see Fig. 15d) will energize relay coil K and energization of K will close relay points K—1. Upon the closure of cam contacts CC—1, the eject magnet 164 will be energized and the card will be ejected from the punch in the manner previously described. Upon the eject of the card the contacts P—3 become closed to energize relay coil L. Energization of relay coil L closes relay points L—1 and upon closure of cam contacts CC—2 there will be an energization of the punch feed clutch magnet 94. Thereupon a new record will be withdrawn from the supply magazine in the punch and advanced through the punching mechanism. The energization of relay coil L will also close relay points L—2 (Fig. 15c). With relay points L—2 closed and relay points F—5 closed in the manner previously explained and upon closure of cam contacts CC—3 a circuit will be established from the 209 side of the A. C. line to the LH reset magnet 166LH. The energization of this magnet resets the LH accumulator in the usual way. A further and separate multiplication can now be performed on the next record card.

During the feed of a card from the R position to the R—1 position and until rack 81 returns to normal right hand position, contacts P—1 will be opened. With contacts P—1 open (see Fig. 15d) relay coil J will be de-energized and the de-energization of this relay will open points J—1 and interrupt the circuit to the punching magnet 121. This will prevent any punching operations being performed until the rack 81 (Fig. 5a) has returned to its extreme right hand position.

It may be mentioned that in starting up a series of computations that upon the first card handling operation while relay points L—2 may be closed, no LH accumulator resetting operation will be initiated at this time since on the first card operation relay points F—5 are open and such contacts only become closed after the computation has been completed on the first card. Upon the eventual reset of the LH accumulator, reset contacts 167 (Fig. 15d) open and break the stick circuit for relay coil F to de-energize relay F.

When the last card has been withdrawn from the card magazine, contacts P—5 (Figs. 5a and 15d) will open and the opening of these contacts will break the circuit for relay coil A. The de-energization of relay coil A will open relay points A—2 and prevent a subsequent energization of the punch clutch feed magnet 94 and will prevent idle operations of the card handling devices in the punch following the punching of the last card.

It has been explained before, that the release of any depressed punch key in entering the multiplier must be preceded by the energization of both a CS and X magnet. It is the energization of both of these magnets and the closure of their associated contacts that causes energization of relay coil N. Relay coil N in turn causes the energization of the interposer latch release magnet 139. If coil 139 does not become energized and a depressed key cannot be released this may be indicative of an insufficient charge being upon condenser 224 and under such conditions it may be desirable to build up the charge on the condenser and to allow the depressed and locked down punch key to be released in order that it may be depressed again. For this purpose an auxiliary key 241 (Fig. 15a) is provided which upon being depressed directly energizes the interposer latch release magnet 139 to allow the locked down punch key to be released and restored to upper position. Upon such key moving to upper position contacts 143 reclose to recharge the condenser 224. Thereupon the punch key can be depressed again to bring about the desired operations and energize both the CS and X magnet. When this auxiliary control is utilized the columnar relation of the card with respect to the punches is not changed nor will punching occur since preceding escapement of the card carriage of the punch and preceding punching, relay points N—2 must be closed. Relay points N—2 do not become closed except under control of relay coil N (Fig. 15a) and relay coil N must be energized by the proper punch key operation followed by the energization of both an X and a CS magnet.

Summarizing, the purposes of the principal improved controls provided upon the present machine are as follows—double key operations are prevented by the interlocks between the interposers. Upon the entry of multiplier amounts, each punch key is locked down by the interposer latch and kept locked down to prevent the depression of another key through the action of the interposer interlocks until multiplier and column shift selection has occurred and until partial products have been created and entry of such partial products effected. Punching of the multiplier amounts in each column is also delayed until partial product creating and entering operations have been properly initiated. The maintained holding down of a punch key upon entering a multiplier amount does not cause erroneous operations or repeated entering operations since the condenser discharge control provides for only a single energizing impulse of the X magnet and the CS magnet and the key must be allowed to come up to normal position to recharge the condenser before a new and following operation can be initiated. The contacts P—1 prevent punching until the rack 81 has returned to right hand position. The contacts P—5 automatically stop further operations in the punch upon the exhaustion of cards from the supply magazine. A new card feed is prevented until the eject of the previous card has been completed, whereupon a new card feed is initiated by the closure of contacts P—3 upon the closure of CC—2. No entering operations either of multiplier or multiplicand can be made while card feed is occurring in the punch since relay D is de-energized at such times. The contacts 134 and 140 and the multiplicand commutator are so arranged that no entry into the multiplicand entry receiving device can be made without effecting punching and conversely no punching of a multiplicand can occur without effecting an entry of the multiplicand into the multiplicand entry receiving means.

The term relay as heretofore used in the specification and as hereafter used in the claims will be understood to refer not only to the purely electrical relays used in the machine such as relays N, E, etc., but also the term will be used to refer to the electro-mechanical relays which are of the type shown in Figures 7 and 8 of the drawings with control relay coils X or CR or CS and with multiple blade contacts 182 and 181.

What I claim is:

1. In a key controlled record perforating and multiplying machine having ten amount entering keys, multiplicand entry receiving and retaining means controlled by said keys to receive multiplicand amounts, multiplying means including multi-contact multiplying relays selected by said keys, receiving means for partial products, a cyclically operable emitter for transmitting differentially timed impulses through the selected multiplying relay contacts and through the multiplicand entry retaining means to the receiving means, said emitter tending to cause repeated entries in successive cycles when a multiplier relay is maintained operated, means controlled by said keys for selecting said multiplying relays for operation, cyclically operable means for operating a selected multiplying relay, said means comprising devices for preventing repeated operation of a selected relay upon a single depression of a key regardless of the duration of depression thereof.

2. A machine according to claim 1 wherein said last mentioned devices comprise a condenser, which condenser is discharged to effect operation of a selected multiplier relay.

3. A machine according to claim 1 wherein the multiplying means also includes column shift relays, one of which is operated simultaneously with a selected multiplying relay by said cyclically operable means, whereby a column shift relay is also operated only once upon a single depression of a key regardless of the duration of depression thereof.

4. In a machine of the class described, a punching mechanism comprising keys for controlling operation thereof and an operating means therefor, a multiplying mechanism comprising selectively operable multiplier relays controlled by said keys, and means controlled by said multiplier relays to prevent operation of said operating means until a selected multiplier relay is operated.

5. A machine according to claim 4 wherein the multiplying mechanism further comprises column shift relays, and wherein further means controlled by said column shift relays are provided to control said preventing means jointly with the multiplier relays, whereby operation of said operating means is prevented until a column shift relay and a multiplier relay are operated.

6. In a machine of the class described, a column by column punching mechanism comprising keys for controlling operation thereof and an operating means therefor, a multiplying mechanism comprising selectively operable multiplying relays controlled by said keys and column shift relays selected by elements of the punching mechanism according to the column of the multiplier which is to be punched, a cyclically operable means and means controlled by the keys to conjointly cause concurrent energization of a selected multiplying relay and a selected column shift relay prior to multiplier digit punching and means jointly controlled by said multiplier relays and by said column shift relays to prevent operation of the operating means until a selected multiplier relay and column shift relay is operated, and to enable said operating means after said selected relays have been operated.

7. A key controlled multiplying machine including a plurality of keys, a key controlled punch, multiplying mechanism including a plurality of control instrumentalities selectively called into action by the keys as they are operated to control punching of a multiplier, including in combination, a punch operating device, cyclically operable means for initiating operation of said device, a cooperating control means controlled by any one of said instrumentalities for deferring the operation of the punch operating device until operation of a control instrumentality is effected according to the key depressed, said cyclically operable means and cooperating control means thereafter calling said punch operating device into operation to punch a multiplier digit.

8. A machine of the class described comprising a key controlled punch having ten amount entering keys, multiplying mechanism including multi-contact multiplying relays selectively operable under control of said keys, a cyclically operable emitter for transmitting impulses through an operated multiplier relay, means for retaining a key depressed upon a multiplier digit entry, release means for said retaining means, a cyclically operable means for operating said release means following each cyclic emission of impulses by the emitter, and means controlled by said multiplying relays for rendering said cyclically operable means ineffective until the contacts of a selected one of said relays have been closed.

9. A machine according to claim 8, wherein the multiplying mechanism also includes multi-contact column shift relays, and wherein the means rendering the cyclically operable means ineffective is also controlled by contacts of the column shift relays.

10. A multiplying machine including item entry keys, a key controlled punch and a multiplicand entry receiving device, means controlled by each of said keys upon initial depression thereof to determine a digital value to be punched, contacts closed by said keys upon said initial depression thereof to select and partially complete an entry circuit for entry of a corresponding digital value in said multiplicand entry receiving device, a punch operating magnet, and key controlled means effective upon complete depression of a key and including two pairs of concurrently closed contacts for concurrently completing the selected entry circuit, and a circuit to the punch operating magnet to cause concurrent entry of a digit value and the punching thereof.

11. A key controlled record perforating and computing machine having entry keys and a key controlled punching mechanism which punches factors of a computation upon a record, record handling means in said punching mechanism for successively advancing a record column by column, multiplicand entry receiving and retaining means selectively controlled by the keys to receive and retain multiplicand digits as the keys are operated to punch the multiplicand factor in a record digit by digit, multiplying relays selected for operation by said keys as the keys are operated to control the punching mechanism to punch the multiplier in the record, column shift relays selected by elements of the record handling means according to the column of the multiplier being punched, key controlled means effective prior to the punching of a multiplier digit for concurrently energizing a selected multiplier relay and a selected column shift relay, punch operating means, means for initiating operation thereof, means controlled by said multiplier and column shift relays to disable said initiating means until a selected multiplier relay and a selected column shift relay are energized, and for enabling said initiating when said selected relays are energized.

12. In a multiplying machine with a result receiving means and a source of impulses for controlling operation of such means, and including in combination, a plurality of selectively operable column shift relays each with multi-contacts for directing concurrent entries into different orders of the result receiving means first in one denominational relation and thereafter in another denominational relation, a plurality of selectively operable multiplying relays each with multi-contacts for selectively concurrently establishing a plurality of impulse circuits to the result receiving means according to which multiplying relay is energized, means for selecting said column shift relays for operation, normally ineffective means for operating said selecting means, and control means for enabling said last named means including a circuit established only upon conjoint closure of contacts of a multiplier relay, and contacts of a selected column shift relay.

13. A multiplying machine with a result receiving device adapted to receive differentially timed impulses from a source of such impulses, a plurality of circuits from said source to said receiving means, a plurality of multiplying relays with multi-contacts for concurrently completing, when closed, certain ones of said circuits, a plurality of column shift means intermediate said multi-contacts and the receiving means for variably denominationally establishing a plurality of said circuits, means for successively selecting individual column shift means for operation, means for operating said selecting means, and a control device for said last named means controlled by contacts of the multiplying relays for suppressing operation of said last named means when the contacts of all multiplying relays are open and for enabling operation thereof when the contacts of any multiplying relay are closed.

14. A machine according to claim 13 wherein said column shift means comprise multi-contact relays and wherein the aforesaid control device is also controlled by contacts of said column shift relays whereby operation of said operating means is suppressed when the multiplying relay contacts and column shift relay contacts are open and enabled when the contacts of a multiplying relay and a column shift relay are closed.

JAMES W. BRYCE.